United States Patent
Nakashima

(10) Patent No.: US 10,511,474 B2
(45) Date of Patent: Dec. 17, 2019

(54) INFORMATION PROCESSING APPARATUS, COMPUTER-READABLE RECORDING MEDIUM HAVING STORED THEREIN PROGRAM, AND METHOD FOR PROCESSING INFORMATION

(71) Applicant: FUJITSU LIMITED, Kawasaki-shi, Kanagawa (JP)

(72) Inventor: Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/890,629

(22) Filed: Feb. 7, 2018

(65) Prior Publication Data
US 2018/0227169 A1   Aug. 9, 2018

(30) Foreign Application Priority Data
Feb. 8, 2017 (JP) .................................. 2017-021458

(51) Int. Cl.
| | |
|---|---|
| *H04L 12/24* | (2006.01) |
| *H04L 12/931* | (2013.01) |
| *H04L 12/707* | (2013.01) |
| *H04L 12/26* | (2006.01) |

(52) U.S. Cl.
CPC .......... *H04L 41/0668* (2013.01); *H04L 45/24* (2013.01); *H04L 49/70* (2013.01); *H04L 43/0817* (2013.01)

(58) Field of Classification Search
None
See application file for complete search history.

(56) References Cited

U.S. PATENT DOCUMENTS

| | | | |
|---|---|---|---|
| 2004/0073700 A1* | 4/2004 | Chaudhuri | H04J 14/0227 709/239 |
| 2005/0268300 A1* | 12/2005 | Lamb | G06F 9/5038 718/100 |
| 2009/0007101 A1* | 1/2009 | Azar | G06F 9/4881 718/1 |
| 2012/0060171 A1* | 3/2012 | Bobroff | G06F 9/505 718/105 |
| 2012/0093023 A1 | 4/2012 | Ficet et al. | |
| 2013/0021922 A1* | 1/2013 | Nakashima | H04L 61/2038 370/244 |

FOREIGN PATENT DOCUMENTS

JP     2012-532481     12/2012

* cited by examiner

*Primary Examiner* — Jeffrey M Rutkowski
*Assistant Examiner* — Andre Tacdiran
(74) *Attorney, Agent, or Firm* — Fujitsu Patent Center

(57) ABSTRACT

In extendedly allocating a job to nodes subordinate to multiple leaf switch, the job is allocated to nodes of each of multiple leaf switches such that that the number of the nodes being allocated thereto the job and belonging to each of the multiple leas switches does not exceed the number of valid links between the leaf switch and the spine switches. This can avoid occurrence of a conflict accompanied by a link failure, so that degrading of the system can be avoided.

12 Claims, 16 Drawing Sheets

INFORMATION PROCESSING APPARATUS, COMPUTER-READABLE RECORDING MEDIUM HAVING STORED THEREIN PROGRAM, AND METHOD FOR PROCESSING INFORMATION

CROSS-REFERENCE TO RELATED APPLICATION

This application is based upon and claims the benefit of priority of the prior Japanese Application No. 2017-021458 filed on Feb. 8, 2017 in Japan, the entire contents of which are hereby incorporated by reference.

FIELD

The embodiment discussed herein relates to an information processing apparatus, a computer-readable recording medium having stored therein a program, and a method for processing information.

BACKGROUND

In a parallel computer system provided with multiple nodes each including a processor, the nodes are communicably to one another via a topology network exemplified by a fat tree consisting of leaf switches and spine switches (see FIG. 1).

In such a network, each leaf switch is connected thereto multiple nodes and multiple spine switches are each connected to the multiple leaf switches via multiple leaf switches (see FIG. 1).

In a fat tree, the number of subordinate nodes connected to each leaf switch is the same as the number of spine switches (links) connected to each leaf switch. This make is possible to secure a bandwidth for inter-node communication that is to be carried out between a leaf switch and a spine switch via a link.

In the above parallel computer system, a user job is allocated to one or more nodes that are to be process the user job by a job scheduler and is then processed in batch processing.

In the batch processing, serial numbers are provided to the multiple nodes, and when a user job is to be allocated to two or more nodes, the job scheduler secures two or more nodes having successive serial numbers among nodes (unoccupied nodes) in an unoccupied state of not being allocated thereto a job. Then, the job scheduler allocates the job to the two or more secured nodes having successive serial numbers (see FIG. 2).

Patent Literature 1: Japanese National Publication of International Patent Application No. 2012-532481

During the system operation, it is ordinary that some of the links between leaf switches and spine switches are not correctly operating and may have failure. When a failure occurs on a link between a leaf switch and a spine switch, the bandwidth after the allocation of jobs narrows to generate a conflict (see FIG. 3), resulting in deterioration of system performance.

SUMMARY

An information processing apparatus of a present embodiment includes, in an information processing system comprising a plurality of nodes, a plurality of first switches that are connected thereto the plurality of nodes, and a plurality of second switches each of which is connected thereto the plurality of first switches via a plurality of links, a processor that allocates a job that uses a predetermined number of nodes to one or more nodes of the plurality of nodes. The processor is configured to retrieve a target first switch being connected thereto the predetermined number or more unoccupied nodes from the plurality of first switches. In a case where the target first switch is retrieved, the processor is configured to allocate the job to the predetermined number of unoccupied nodes connected to the target first switch. In contrast, in a case where the target first switch is not retrieved, the processor is configured to allocate the job to unoccupied nodes connected to each of two or more of the plurality of the first switches and not exceeding a number of valid links among the plurality of links connected to the first switch.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF THE PREFERRED EMBODIMENTS

Hereinafter, detailed description will now be made in relation to an information processing apparatus, a computer-readable recording medium having stored therein a program, and a method for processing information disclosed herein by the description with reference to accompanying drawings. The following embodiment is exemplary and has no intention to exclude various modifications and applications of techniques not referred in the present embodiment. In other words, various changes and modifications can be suggested without departing from the spirit of the present embodiment. The drawings do not illustrate therein all the functions and elements included in the embodiment and may include additional functions and elements to those illustrated in the accompanying drawings. The present embodiment and the modifications can be appropriately combined as long as no contradiction arises in the process.

(1) Overview of the Present Embodiment

Figure 1:
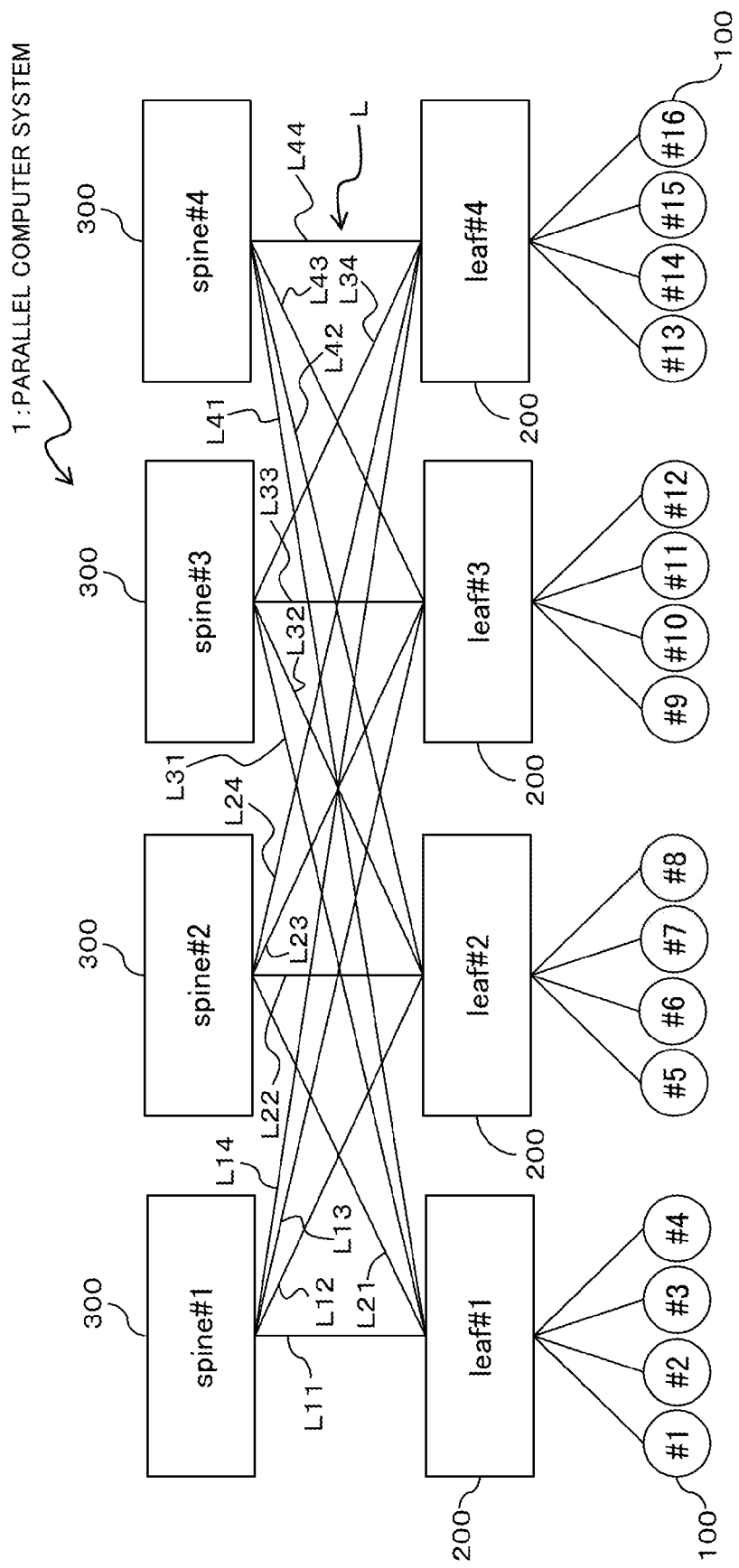
FIG. 1 is a block diagram schematically illustrating an example of the configuration of a parallel computer system.

FIG. 1 is a block diagram illustrating an example of the configuration of a parallel computer system (information processing system, supercomputer system) 1. As illustrated in FIG. 1, the parallel computer system 1 includes multiple nodes 100 each including a processor. The nodes 100 are communicably connected to one another via a topology network, such as a fat tree consisting of leaf switches 200 and spine switches 300.

In this configuration, each of the multiple leaf switches 200 is connected thereto multiple nodes 100, and each spine switch 300 is connected to the multiple leaf switches 200 through multiple links L. Each leaf switch 200 is directly connected to multiple nodes 100 and thereby communicably connects the nodes 100 directly connected thereto the leaf switch 200 to one another. Each spine switch 300 communicably connects all the nodes 100 with one another via the multiple links L and the multiple leaf switches 200.

For example, the parallel computer system 1 of FIG. 1 is provided with 16 nodes 100 provided with serial numbers #1 through #16. Here, an arbitrary node is provided with a reference number 100 and is therefore expressed by "node 100". Meanwhile, a particular node is represented by using a node number #k (k is an integer of from 1 to 16) and is therefore expressed by "node #k".

In the example of FIG. 1, the parallel computer system 1 is provided with four leaf switches 200 and four spine switches 300. Switch numbers #1-#4 are serially provided to the switches 200 and 300. Here, an arbitrary leaf switch or spine switch are provided with reference numbers 200 and 300 and are therefore expressed by a "leaf switch 200" and a "spine switch 300". Meanwhile, particular leaf switch and spine switch are represented by using switch numbers #i and #j (i and j are each an integer of 1-4), respectively, and are therefore expressed by a "leaf #i" and a "spine #j", respectively. A leaf switch and a spine switch correspond to a first switch and a second switch, respectively, and are sometimes referred to as a "leaf SW" and a "spine SW", respectively.

Figure 7:
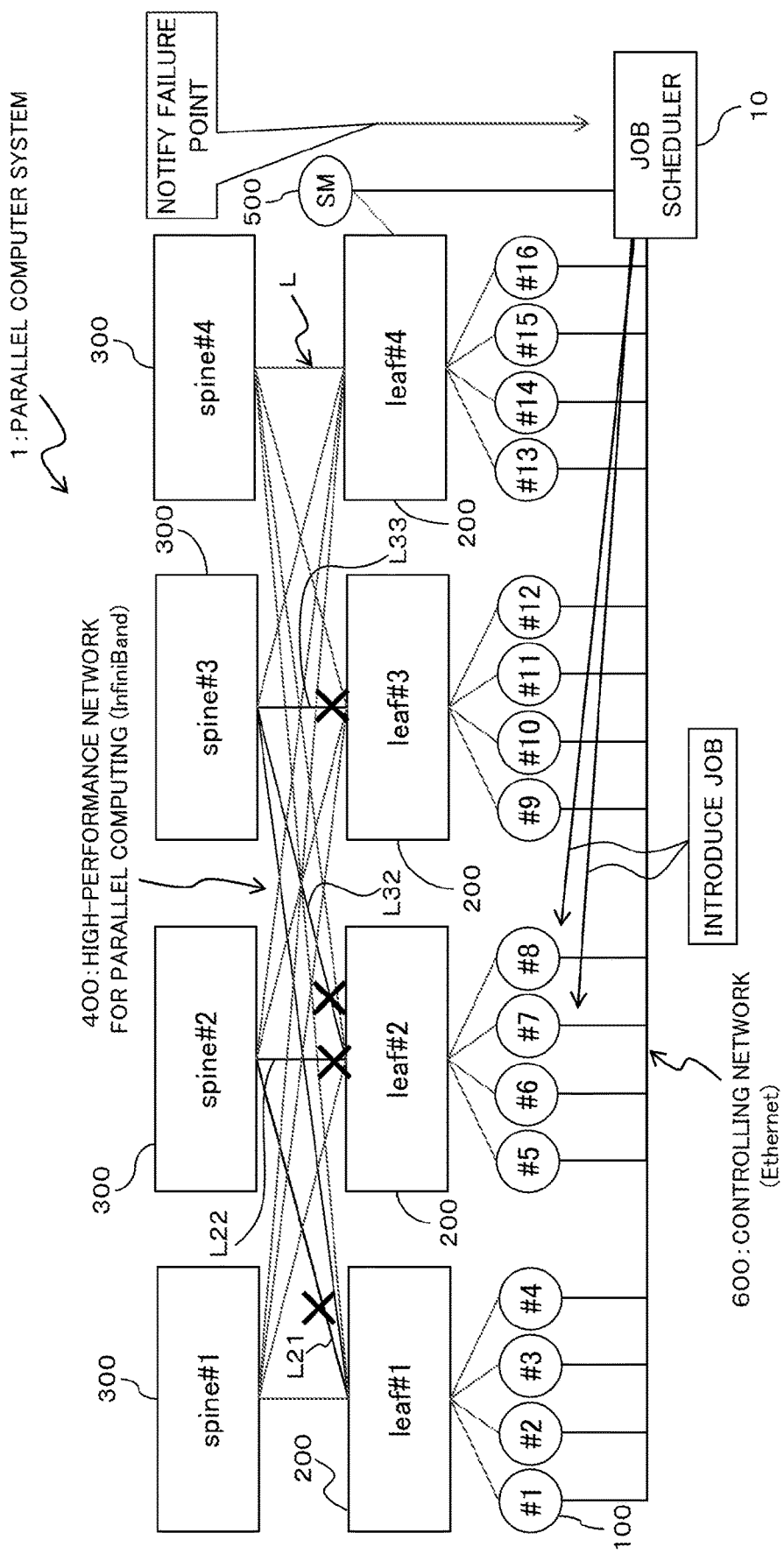
FIG. 7 is a block diagram schematically illustrating an example of the entire configuration of a parallel computer system applied thereto an information processing apparatus of the present embodiment of FIG. 6.

In the example of FIG. 1, a leaf switch 200 and a spine switch 300 are connected via a link L of a high-performance network (InfiniBand) 400 for parallel computing (see FIG. 7). Here, an arbitrary link L is represented by using a reference symbol L and is therefore expressed by a "link L". A particular link that connects the leaf #i and the spine #j is expressed by "link Lij" through using the switch numbers #i and #j. The parallel computer system 1 in the example of FIG. 1 is provided with 16 links L11-L14, L21-L24, L31-L34, and L41-L44.

In a fat tree, the number of subordinate nodes 100 and connected to each individual leaf switch 200 is the same as the number of spine switch 300 (i.e., the number of links) connected to each individual leaf switch 200. In the example of FIG. 1, four subordinate nodes 100 are connected to each individual leaf switch 200 and four subordinate leaf switches 200 are connected to each individual spine switch 300. Specifically, the spine #1 has four subordinate leafs #1-#4 respectively connected via links L11-L14; the spine #2 has four subordinate leafs #1-#4 respectively connected via links L21-L24; the spine #3 has four subordinate leafs #1-#4 respectively connected via links L31-L34; and the spine #4 has four subordinate leafs #1-#4 respectively connected via links L41-L44. To the leaf #1, four subordinate nodes #1-#4 are connected; four subordinate nodes #5-#8 are connected to the leaf #2; four subordinate nodes #9-#12 are connected to the leaf #3; and four subordinate nodes #13-#16 are connected to the leaf #4. This configuration can secure a bandwidth for communication between nodes 100 via links L between leaf switches 200 and spine switches 300.

In the above parallel computer system 1, a user job is allocated to one or more nodes 100 that are to process the user job by the job scheduler and is processed through batch processing.

In allocating the user job to two or more nodes 100 in order of the serial numbers provided to the nodes 100 for the batch processing, traditional technique has been secured two or more successive nodes (i.e., having successive serial numbers) being in an unoccupied state where t no job is allocated thereto, and allocated the secured nodes 100. Then, the user job is allocated to the two or more secured successive nodes 100.

Figure 2:
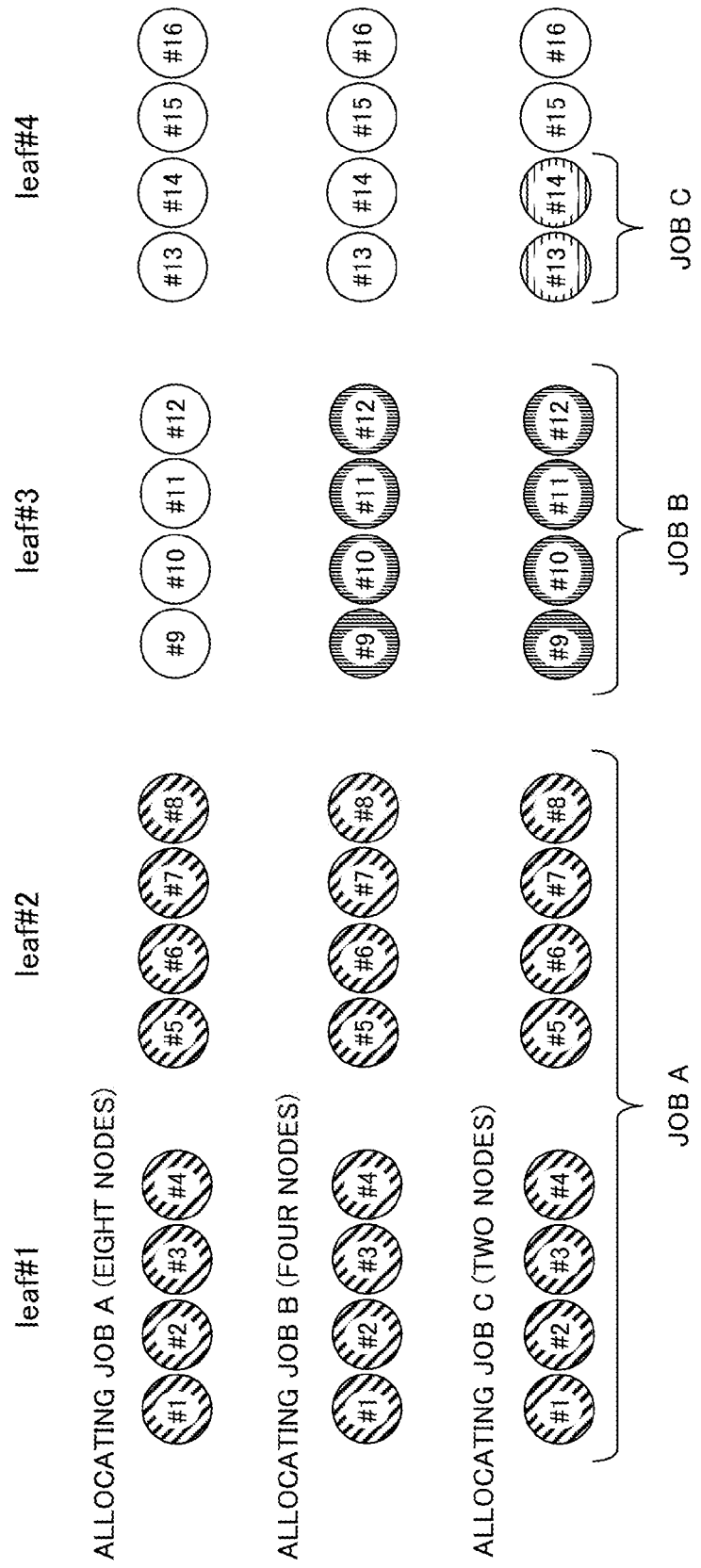
FIG. 2 is a diagram illustrating an example of allocating a job to each node in a parallel computer system of FIG. 1.

For example, assuming that all the nodes #1-#16 are in an unoccupied state, allocation of jobs A, B, and C which respectively use eight nodes 100, four nodes 100, and two nodes 100 in this order is carried out as illustrated in FIG. 2. Specifically, eight nodes #1-#8 being in an unoccupied state and subordinate to the leaves #1 and #2 are firstly secured for the job A, and the job A is allocated to the nodes #1-#8 (see the top row of FIG. 2). Then, four nodes #9-#12 being in an unoccupied state and subordinate to the leave #3 are secured for the job B, and the job B is allocated to the nodes #9-#12 (see the middle row of FIG. 2). Finally, two nodes #13 and #14 being in an unoccupied state and subordinate to the leave #4 are secured for the job C, and the job C is allocated to the nodes #13 and #14 (see the bottom row of FIG. 2). FIG. 2 illustrates an example of allocating a job to each nodes 100 in the parallel computer system 1 of FIG. 1.

While the parallel computer system 1 is operating, it is ordinary that some of the links L between the leaf switches 200 and the spine switches 300 are not correctly operating and may have failure (link down). In cases where a link L between a leaf switch 200 and the spine switch 300 has a failure (link down), the bandwidth after the allocation of a job narrows and causes a conflict as illustrated in FIG. 3, so that the system performance is to be degraded.

Figure 3:
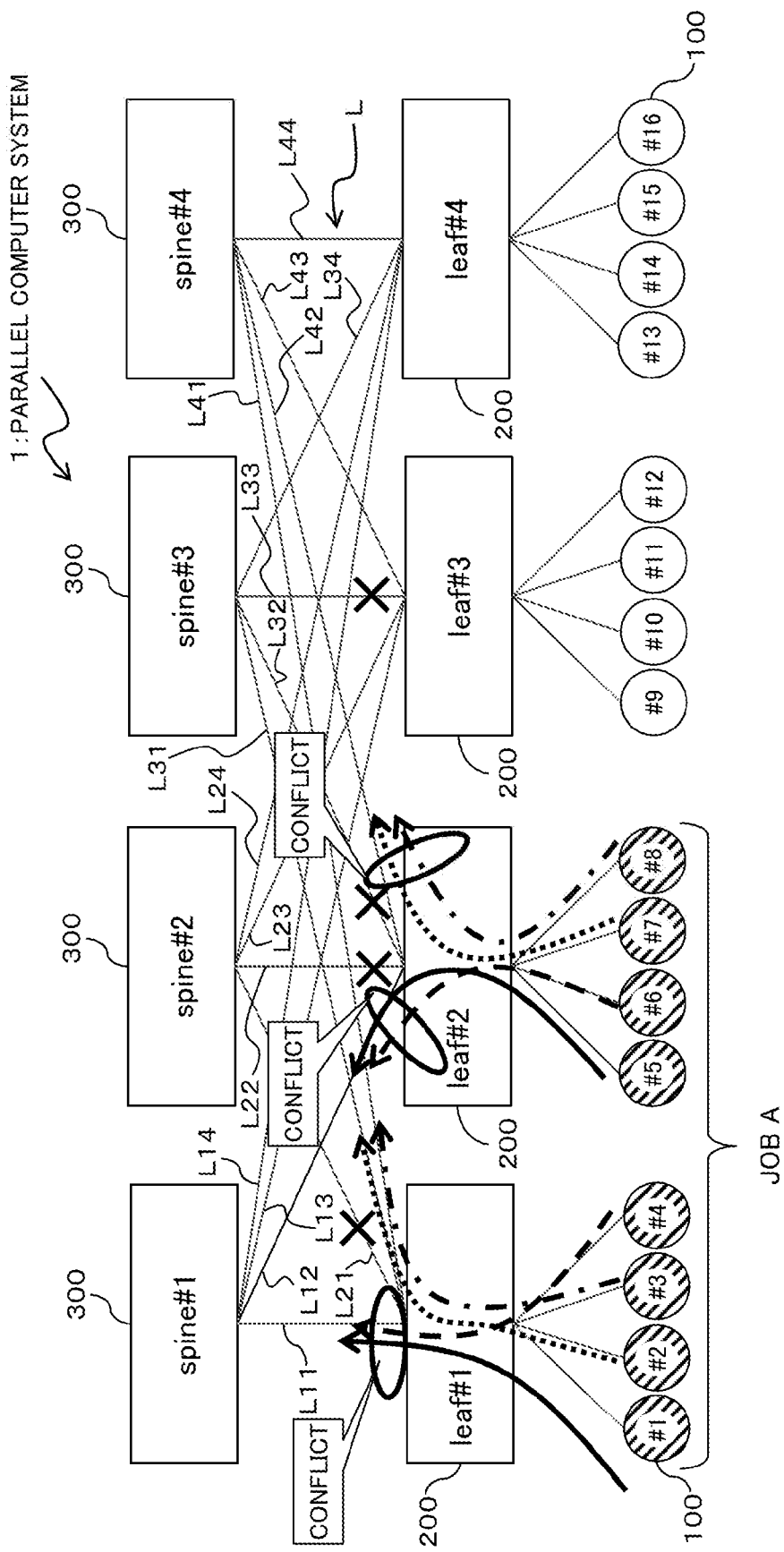
FIG. 3 is a diagram illustrating an example of a state where a conflict accompanied by a link failure occurs in a parallel computer system of FIG. 1.

FIG. 3 illustrates an example of a state where a conflict accompanied by a link failure (link down) occurs in the parallel computer system 1 of FIG. 1. The example of FIG. 3 illustrates a state where the job A is allocated to nodes #1-#8 as the top row of FIG. 2 under a state where failures (link down) occur on the links L21, L22, L32, and L33. At that time, conflicts occur on the normal (valid) links L11, L12, and L42, leading degrading of the system performance.

In order to avoid such an inconvenience, in allocating a job using a predetermined number of nodes to nodes 100 in the parallel computer system 1 of FIG. 1, the present embodiment retrieves a leaf switch 200, to which unoccupied nodes 100 equal to or more than the predetermined number are connected, among the multiple leaf switches 200. An unoccupied node 100 is a node 100 in an unoccupied state, to which no job is being allocated.

In cases where a single leaf switch 200 that unoccupied nodes 100 equal to or more than the predetermined number are connected to is retrieved, the job is allocated to the unoccupied nodes 100 connected to the retrieved leaf switch 200.

In cases where no leaf switch 200 that unoccupied nodes 100 equal to or more than the predetermined number are connected to is retrieved, the allocation of the job is carried out in the following manner. Specifically, the job is allocated to unoccupied nodes 100 being connected to each of two or more leaf switches 200 such that the number of the unoccupied nodes allocated thereto a job in each of the two or more leaf switches 200 does not exceed the number of valid links among the links L connected to the leaf switch 200.

Figure 4:
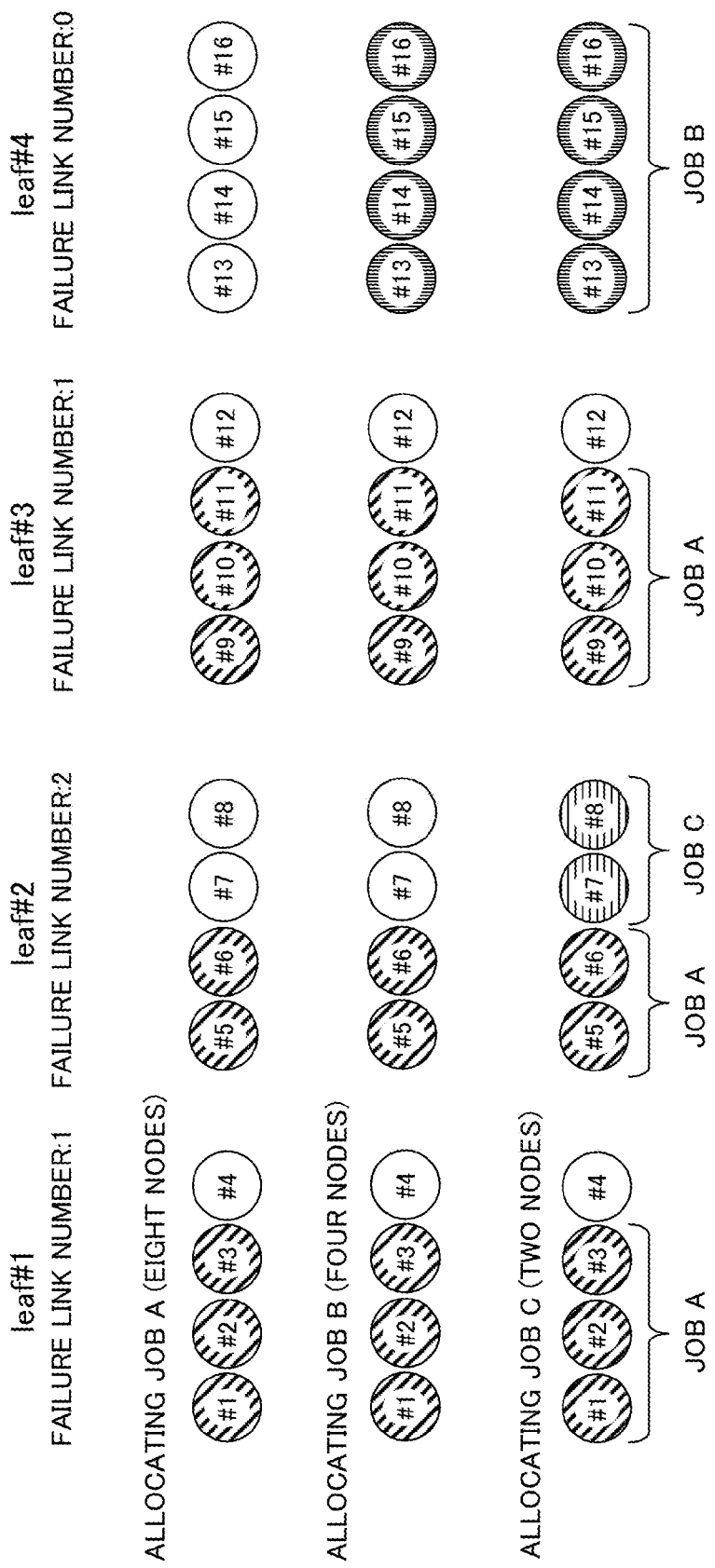
FIG. 4 is a diagram illustrating an overview of a scheme of job scheduling according to the present embodiment applied to a parallel computer system of FIG. 1.

For example, FIG. 4 illustrates allocation of the jobs the same as that of FIG. 2 in the manner of the present embodiment in cases where all the nodes #1-#16 are in an unoccupied state but the leaves #1-#4 have failure link numbers of 1, 2, 1, and 0, respectively. A failure link number represents the number of links each having a failure among four links connected to a leaf switch 200. FIG. 4 is a diagram illustrating an overview of the manner of job scheduling of the present embodiment applied to the parallel computer system 1 of FIG. 1. The failure link numbers 1, 2, 1, and 0 means that the leaf #1 to the leaf #4 have valid link numbers 3, 2, 3, and 4 among four links connected to each leaf switches 200.

As illustrated in FIG. 4, the job A that uses eight nodes 100 is allocated to three nodes #1-#3 subordinate to the leaf #1, two nodes #5 and #6 subordinate to the leaf #2, and three nodes #9-#11 subordinate to the leaf #3 (see the top row of FIG. 4).

In allocating a single job A extendedly to nodes subordinate to different leaf switches 200, the present embodiment allocates the job A to unoccupied nodes 100 of each of the different leaf switches 200 not exceeding the number of valid upper links (routes). This means that, in allocating a job to nodes 100 belonging to different leaf switches 200, the job allocation is controlled such that job A is allocated to unoccupied nodes of each leaf switches 200 not exceeding the number of valid upper links of the leaf switch 200. This inhibits occurrence of a conflict accompanied by a link failure in the communication after the job allocation, so that degrading of the system performance, such as lowering of an amount of transferred data per unit time, can be avoided. Here, a "valid upper link" means a valid link on the upper side of a leaf switch 200, in other words, a valid link between a leaf switch 200 and a spine switch 300.

After the allocation of the job A, a single leaf #4 that four unoccupied nodes 100 are connected to is retrieved for allocating of the job B that uses four nodes 100, as illustrated in FIG. 4. Consequently, the job B is allocated to the four nodes #13-#16 subordinate to the leaf #4 (see the middle row of FIG. 4).

Then, in allocating the job C that uses two nodes 100 after the allocation of the job B, a single leaf #2 that two unoccupied nodes 100 are connected to is retrieved. Consequently, the job C is allocated to the two nodes #7 and #8 subordinate to the leaf #2 (see the bottom row of FIG. 4).

In this case, jobs are allocated to all the four nodes #5-#8 of the leaf #2 being in a state of having a failure link number of two. The nodes having a high possibility of using links L12, L22, L32, and L42 are two nodes #5 and #6 that the job A is allocated to, and the two nodes #7 and #8 allocated thereto the job C that uses only two nodes have a low possibility of using links L12, L22, L32, and L42. Accordingly, even if jobs are allocated to all the four nodes #5-#8 of the leaf #2 being in a state of having a failure link number of two as illustrated in the bottom row of FIG. 4, there is a low possibility of occurrence of a conflict as occurred in the example of FIG. 3.

Figure 5:
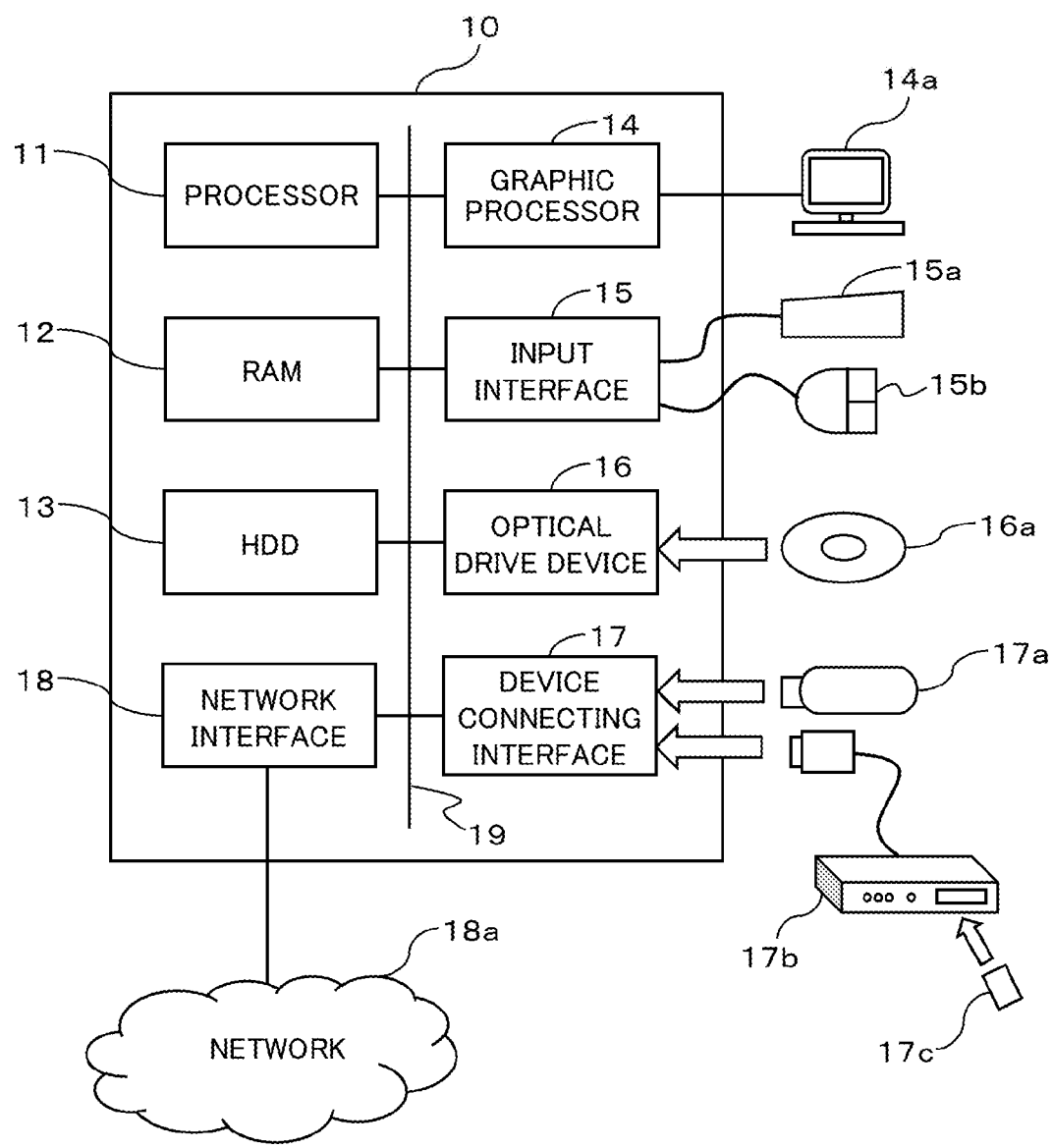
FIG. 5 is a block diagram schematically illustrating an example of the hardware configuration of an information processing apparatus that achieves a job scheduling function of the present embodiment of the present invention.

(2) Hardware Configuration of the Information Processing Apparatus of the Present Embodiment That Achieves the Function of Job Scheduling Description will now be made in relation to the hardware configuration of an information processing apparatus (computer, job scheduler) 10 that achieves the function of job scheduling of the present embodiment with reference to FIG. 5. FIG. 5 is a block diagram schematically illustrating an example of the hardware configuration.

For example, the computer 10 of the present embodiment includes hardware elements of a processor 11, a Random Access Memory (RAM) 12, a Hard Disk Drive (HDD) 13, a graphic processor 14, an input interface 15, an optical drive device 16, a device connecting interface 17, and a network interface 18. These functional elements 11-18 are communicably connected to one another via a bus 19.

The processor 11 controls the entire computer 10. The processor 11 may be a multi-processor. Examples of the processor 11 are a Central Processing Unit (CPU), a Micro Processing Unit (MPU), a Digital Signal Processor (DSP), an Application Specific Integrated Circuit (ASIC), a Programmable Logic Device (PLD), and a Field Programmable Gate Array (FGPA). The processor 11 may be a combination of two or more of a CPU, an MPU, a DSP, an ASIC, a PLD, and an FPGA.

The RAM (memory) 12 is used as the main memory of the computer 10. In the RAM 12, at least one of the Operating System (OS) program and application programs that are to be executed by the processor 11 is temporarily stored. In the RAM 12, various pieces of data needed for processes to be executed by the processor 11 are stored. The application programs may include a job scheduling program (program; see reference number 31 of FIG. 6) that is to be executed by the processor 11 in order to achieve the job scheduling function of the present invention in the computer 10.

The HDD (memory) 13 magnetically writes and reads data into and from an internal disk. The HDD 13 is used as an auxiliary memory of the computer 10. In the HDD 13, the OS program, application programs, and various pieces of data are stored. Another example of the auxiliary memory is a Storage Class Memory (SCM) or a Solid State Drive (SSD) such as a flash memory.

To the graphic processor 14, a monitor (a display unit, an outputting unit) 14a is connected. The graphic processor 14 displays an image on the screen of the monitor 14a in obedience to an instruction from the processor 11. An example of the monitor 14a is a display using a Cathode Ray Tube (CRT) and a liquid crystal display.

To the input interface 15, a keyboard 15a and a mouse 15b are connected. The input interface 15 transmits signals transmitted from the keyboard 15a and the mouse 15b to the processor 11. The mouse 15b is an example of a pointing device and may be replaced by another pointing device, which is exemplified by a touch panel, a tablet, a touch pad, and a trackball.

The optical drive device 16 reads data stored in an optical drive device 16a by utilizing laser light. The optical drive device 16a is a portable non-transitory recording medium into which data is readably recorded through the use of reflection of light. Examples of the optical drive device 16a is a Digital Versatile Disc (DVD), a DVD-RAM, a Compact Disc Read Only Memory (CD-ROM), and a CD-R/RW (Recordable/ReWritable).

The device connecting interface 17 is a communication interface to connect a peripheral device to the computer 10. For example, a memory device 17a and a memory reader-writer 17b are connected to the device connecting interface 17. The memory device 17a is a non-transitory recording medium mounting thereon a communication function with the device connecting interface 17, and is exemplified by a Universal Serial Bus (USB) memory. The memory reader-writer 17b writes and reads data into and from the memory card 17c. The memory card 17c is a card-type non-transitory recording medium.

The network interface 18 is connected to a network 18a. The network interface 18 transmits and receives data to and from another computer or a communication device via the network 18a.

The job scheduling function of the present embodiment is achieved by the computer 10 having the above hardware configuration.

The computer 10 achieves the job scheduling function of the present embodiment by executing a program (e.g. a job scheduling program 31 to be described below) recorded in a non-transitory computer-readable recording medium. The program describing the contents of a process that the computer 10 is made to execute can be stored in a various recording media. For example, the program that the computer 10 is made to execute can be stored in the HDD 13. The processor 11 loads at least one of the programs stored in the HDD 13 to the RAM 12, and executes the loaded program.

Alternatively, the program that is the computer (processor 11) is made to execute may be stored in a non-transitory portable recording medium such as the optical drive device 16a, the memory device 17a, or the memory card 17c. The program stored in a non-transitory portable recording medium is installed into the HDD 13 under control of the processor 11 and then comes to be executable. Alternatively, the processor 11 may directly read the program from a non-transitory portable recording medium and execute the program.

Figure 6:
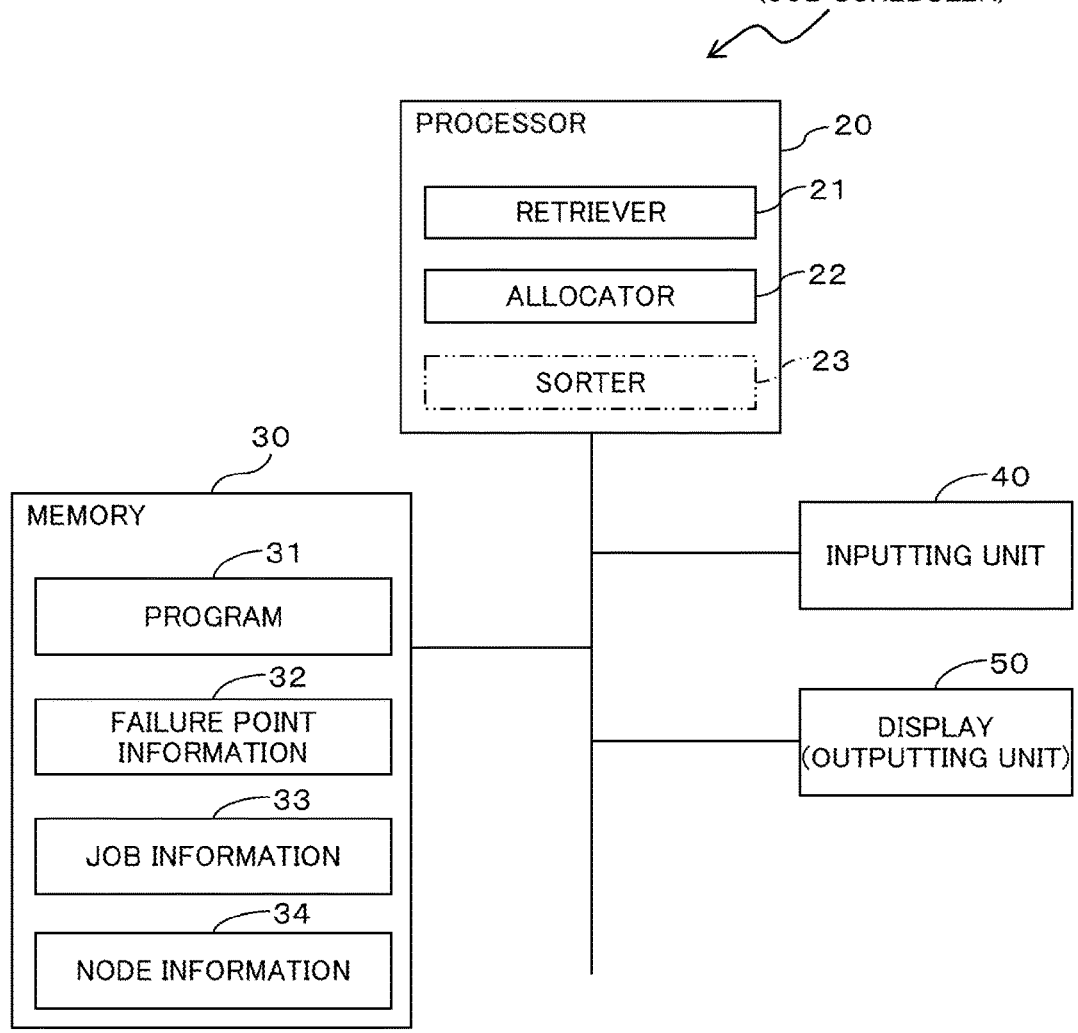
FIG. 6 is a block diagram schematically illustrating an example of the functional configuration of an information processing apparatus that achieves a job scheduling function of the present embodiment of the present invention.

(3) Functional Configuration of the Information Processing Apparatus of the Present Embodiment That Has the Job Scheduling Function Description will now be made in relation to the functional configuration of an information processing apparatus (computer, job scheduler) 10 that has the job scheduling function of the present embodiment with reference to FIG. 6. FIG. 6 is a block diagram schematically illustrating an example of the functional configuration.

The computer 10 exerts the job scheduling function. Namely, the computer 10 exerts the function as the job scheduler 10 that allocates a job that uses a predetermined number of nodes 100 to one or more nodes 100 among the multiple nodes 100 in the information processing system 1 like that illustrated in FIG. 1. For this purpose, the computer 10 has the functions as at least a processor 20, a memory 30, an inputting unit 40, and a display unit 50, as illustrated in FIG. 6.

An example of the processor 20 is the processor 11 illustrated in FIG. 5. The processor 20 exerts the functions of a retriever 21, an allocator 22, and a sorter 23 that are to be described below by executing the job scheduling program 31.

Examples of the memory 30 is the RAM 12 and the HDD 13 illustrated in FIG. 5, and records and stores therein various pieces of information to achieve the job scheduling function. Example of the various pieces of information include the above job scheduling program 31, failure point information 32, job information 33, and node information 34.

As described above, the job scheduling program 31 causes the processor 20 (the processor 11) to exerts the functions as the retriever 21, the allocator 22, and the sorter 23 to be detailed below.

Figure 8:
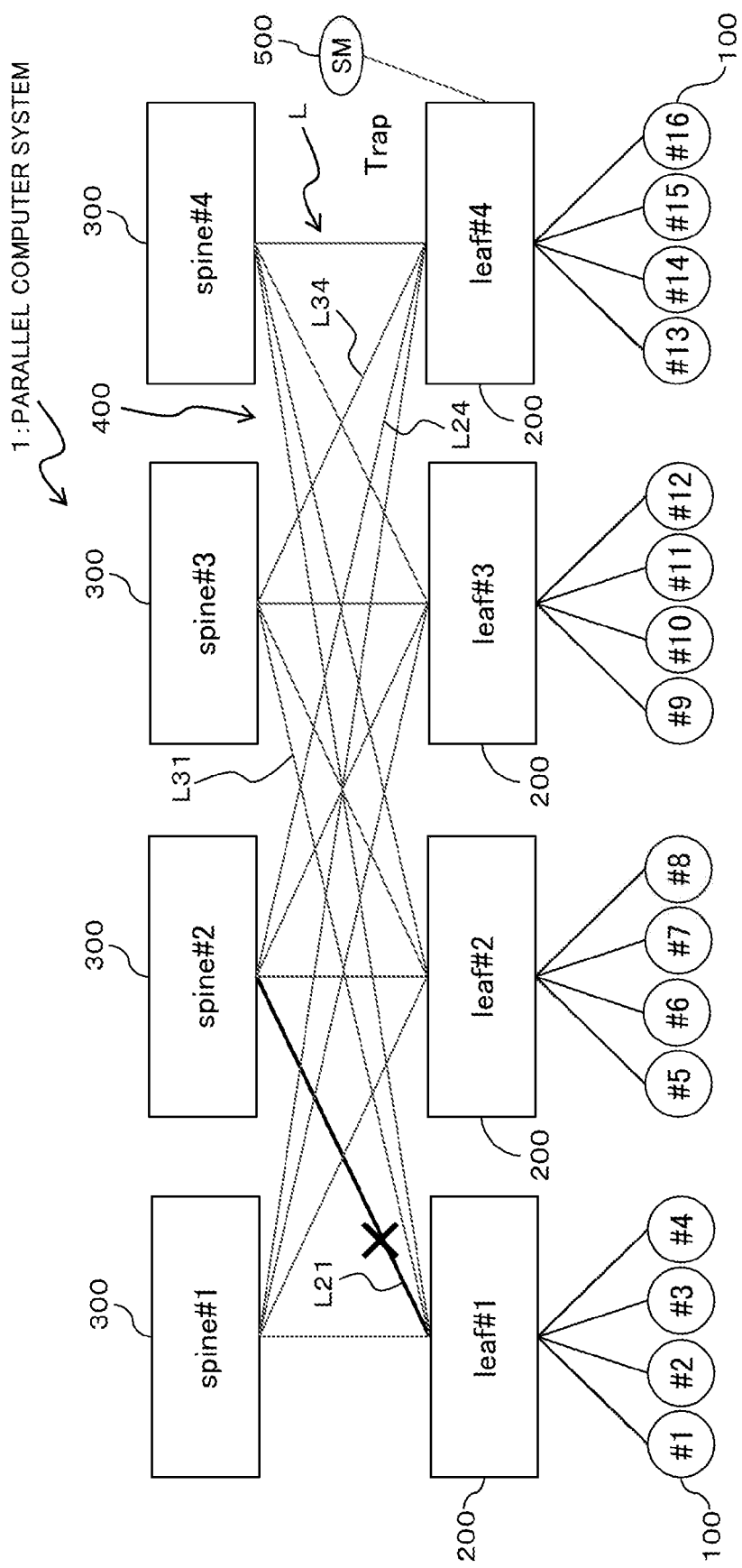
FIG. 8 is a block diagram schematically illustrating an operation performed by a subnet manager in a parallel computer system of FIG. 7.

The failure point information 32 is information related to a failure link (link down) detected by a subnet manager 500 that is to be described below with reference to FIGS. 7 and 8, and includes, for example, link specification information to specify a failure link.

The job information 33 is information related to a job to be allocated to one or more nodes in the parallel computer system 1, and includes, for example, job specification information to specify a job and the number of nodes 100 that is to be used for the job.

The node information 34 is information related to the nodes 100 being targets of job allocation and constituting, for example, the parallel computer system 1 illustrated in FIG. 1. The node information 34 includes, for example, node specification information to specify each node 100, information of a job allocated to each node 100, information representing whether each node 100 is an unoccupied node, and information related to the leaf switches 200 and the spine switches 300 that connect nodes 100 to one another.

Examples of the inputting unit 40 are the keyboard 15a and the mouse 15b illustrated in FIG. 5, is operated by the user, and issues various instructions for the job scheduling. The mouse 15b may be replaced by a touch panel, a tablet, a touch pad, and a trackball.

An example of the display unit 50 is a monitor 14a illustrated in FIG. 5 and the displaying state thereof is controlled via (by) the graphic processor 14. In the present embodiment, the display unit 50 displays and outputs various pieces of information related to, for example, job scheduling.

Next, description will now be made in relation to the retriever 21, the allocator 22, and the sorter 23 achieved by the processor 20 (the processor 11).

The retriever 21 retrieves a leaf switch 200 that is connected thereto a predetermined number or more occupied nodes 100 are connected among the leaf switches 200 in allocating a job that uses the predetermined number of node to the nodes 100. In this event, the retriever 21 retrieves the leaf switch 200 with reference to, for example, information representing whether each node is an unoccupied node in the node information 34 stored in the memory 30 and information related to each leaf switch 200.

If a single leaf switch 200 that is connected thereto a predetermined number or more unoccupied nodes 100 is retrieved by the retriever 21, the allocator 22 allocates the job to the unoccupied nodes 100 connected to the retrieved single leaf switch 200 (see the middle and bottom row of FIG. 4).

In contrast, if a single leaf switch 200 that is connected thereto a predetermined number or more unoccupied nodes 100 are connected is not retrieved by the retriever 21, the allocator 22 carries out the following allocation. Specifically, the allocator 22 allocates the job to the predetermined number of unoccupied nodes 100 being connected to each of two or more leaf switches 200 and not exceeding the number of valid links among the links L connected to the leaf switch 200 (see the top row of FIG. 4). In this event, the allocator 22 allocates the job with reference to the failure point information 32, the job information 33, and the node information 34 stored in the memory 30.

The result of job allocation by the allocator 22 is registered in, for example, the node information 34 of the memory 30. The operation of the job scheduling by the retriever 21 and the allocator 22 of the present embodiment will be detailed below with reference to FIGS. 9-12.

The function of the sorter 23 is used in the two modifications that are to be detailed below with reference to FIGS. 13-16.

An example of the sorter 23 sorts the multiple leaf switches 200 in descending order of the number of failure links (i.e., in order of decreasing the number of failure links) among the links L connected to each leaf switch 200 before the retrieval operation performed by the retriever 21. The retriever 21 retrieves leaf switch 200 (target leaf switch) that a predetermined number or more unoccupied nodes 100 to by determining whether the predetermined number or more unoccupied nodes are connected to each leaf switch 200 in the order obtained through the sorting by the sorter 23. An exemplary operation of the sorter 23 will be detailed below with reference to FIGS. 13 and 14.

Another example of the sorter 23 sorts the multiple leaf switches 200 in ascending order of the number of failure links (i.e., order of increasing the number of failure links) among the links L connected to each leaf switch 200 before the allocation operation performed by the allocator 22. The allocator 22 allocates the job to unoccupied nodes not exceeding the number of valid links connected to each leaf switch 200 in the order obtained through the sorting by the sorter 23. Another exemplary operation of the sorter 23 will be detailed below with reference to FIGS. 15 and 16.

(4) Configuration of the Parallel Computer System 1 Adopted Thereto the Information Processing Apparatus of the Present Embodiment Next, description will now be made in relation to the configuration of the parallel computer system 1 to be adopted thereto the job scheduler 10 of the present embodiment with reference to FIGS. 7 and 8. FIG. 7 illustrates an example of the entire configuration of the parallel computer system 1; and FIG. 8 is a block diagram schematically illustrating the operation performed by a subnet manager (SM) 500 of the parallel computer system 1.

In the parallel computer system 1 of FIG. 7, the nodes 100 are communicably connected to one another via a topology network in the form of a fat tree consisting of the leaf switches 200 and the spine switches 300 likewise the example of FIG. 1. A leaf switch 200 and a spine switch 300 are connected to each other through a link L of a high-performance network (InfiniBand) 400 for parallel computing.

The parallel computer system 1 of the present invention includes a subnet manager (SM) 500 that is to be detailed below and the job scheduler 10 described above.

The subnet manager (SM) 500 has functions of monitoring the state of the high-performance network 400 (links L) for parallel computing and, in the event of detecting a link failure, setting a detour. The subnet manager 500 is connected to, for example, leaf #4 and monitors the state of the high-performance network 400 for parallel computing via the leaf #4 and the links L. The specific operations of the subnet manager 500, for example, operation of detecting a failure point and setting a detour will be described below with reference to FIG. 8.

The job scheduler 10 is connected to each node 100 through a controlling network (Ethernet: registered trademark) 600, and allocates and introduces a job to each node 100 via the controlling network 600. The job scheduler 10 is notified of information related to a failure point detected by the subnet manager 500 from the subnet manager 500, and stores the notified information, as the failure point information 32, in the memory 30 of the job scheduler 10.

In the parallel computer system 1 of FIG. 7, the subnet manager 500 and the job scheduler 10 are configured to be computers accommodated in different cases. Alternatively, a single computer may be configured to exert the functions of both the subnet manager 500 and the job scheduler 10.

FIG. 7 illustrates an example of failures occurring on links L21, L22, L32, and L33, and these link failure points are detected by the subnet manager 500 and notified to the job scheduler 10. Here, the operations performed by the subnet manager 500 of detecting the link L21 to be a failure point and setting a detour not passing through the link L21 will be described below with reference to FIG. 8.

First of all, when a failure (link down) of the link L21 is detected by the spine #2 and the leaf #1, the failure is notified to the subnet manager 500 through a trap operation. The failure detection by the spine #2 is notified to the subnet manager 500 through the link L24 and the leaf #4, and the failure detection by the leaf #1 is notified to the subnet manager 500 through the link L31, the spine #3, the link L34, and the leaf #4.

Upon receipt of failure notification from the spine #2 and the leaf #1, the subnet manger 500 checks the state of the port of the spine #2 through the leaf #4 and the link L24, and checks the state of the port of the leaf #1 through the leaf #4, the link L34, the spine #3, and the link L31.

Consequently, the subnet manager 500 detects disconnection of the link L21 and notifies the job scheduler 10 of the disconnection, as the failure point information 32. Furthermore, the subnet manager 500 sets a new routing that detour the failure link L21 to the leaf #4 and spine #2 through the link L24 and also to the leaf #1 through the leaf #4, the link L34, the spine #3, and the link L31

(5) Operation of the Information Processing Apparatus of the Present Embodiment Having a Job Scheduling Function Next, description will now be made in relation to a specific operation of job scheduling by the job scheduler 10 of the present embodiment with reference to FIGS. 9-12.

First of all, description will now be made in relation to a job scheduling operation by the job scheduler (information processing apparatus) 10 of the present invention with reference to a flow diagram (step S1-S3) of FIG. 9. In step S1, in cases where a job can be allocated to nodes 100 subordinate to a single leaf switch, the job scheduler 10 allocates the job to nodes 100 subordinate to the single leaf switch. The process of step S1 will be detailed below with reference to FIG. 10.

In cases where the job is not able to be allocated to nodes 100 subordinate to a single leaf switch 200, which means that the job is to be extendedly allocated to nodes 100 subordinate to multiple leaf switches, the job scheduler 10 carries out the process of step S2. In step S2, the job scheduler 10 allocates the job such that the number of allocated jobs (i.e., the number of nodes in a single leaf switch 200 to be allocated thereto the job) of each of leaf switches 200 that are to be allocated thereto the job does not exceed the number of effective upper links. The process of step S2 will be detailed below with reference to FIG. 11.

In cases where the job is not able to be allocated both in steps S1 and S2, the job scheduler 10 allocates the job to unoccupied nodes regardless of validity/invalidity of the upper link of each of the unoccupied nodes (step S3) and terminates the job scheduling operation (job allocation process).

Next, description will now be made in relation to a job scheduling operation (process of step S1 of FIG. 9) when a job is to be allocated to nodes 100 subordinate to a single leaf switch 200 with reference to flow diagram FIG. 10 (steps S11-S14).

In step S11, the job scheduler 10 (retriever 21) compares the number (unoccupied node number) of unoccupied nodes 100 subordinate to a single leaf switch (target leaf switch) of the process target with the number (job node number; the predetermined number) of nodes 100 that are to be used for the job to be allocated. Here, the target leaf switch 200 may be selected from among the multiple leaf switches 200 in ascending or descending order of the switch number #i.

If the number of unoccupied nodes in the target leaf switch 200 is equal to or more than the job node number (YES route in step S11), the target leaf switch 200 is retrieved to be a single leaf switch 200 that the predetermined number or more unoccupied nodes 100 are connected to. In this case, the job scheduler 10 (allocator 22) allocates the job to be allocated to the unoccupied nodes 100 connected to the target leaf switch 200 in step S12, and terminates the job allocation process.

In contrast, if the number of unoccupied nodes in the target leaf switch 200 is less than the job node number (NO route in step S11), the job scheduler 10 (retriever 21) confirms, in step S13, whether all the leaf switches 200 have undergone the process of step S11.

If at least one of the leaf switches 200 has not undergone the process of step S11 (NO route in step S13), the job scheduler 10 (retriever 21) selects, in step S14, a next leaf switch 200 as the target leaf switch 200, and returns to the process of step S11.

If all the leaf switches 200 have undergone the process of step S11 (YES route in step S13), the parallel computer system 1 is determined to be in a state where the job to be allocated is not able to be allocated to nodes 100 subordinate to a single leaf switch 200. Namely, the job scheduler 10 (allocator 22) determines that the job is to be allocated extendedly to nodes subordinate to multiple leaf switches and then moves to the process of step S2 of FIG. 9 (step S21 of FIG. 11).

Next, description will now be made in relation to a job scheduling operation (process of step S2 of FIG. 9) when a job is to be allocated to nodes 100 subordinate to multiple leaf switches 200 with reference to a flow diagram (steps S21-S27) of FIG. 11.

First of all, the job scheduler 10 (allocator 22) sets an undetermined node number Rest to the job node number (the above predetermined number) in step S21. After that, the job scheduler 10 (allocator 22) calculates a function N=Min (unoccupied nodes subordinate to target leaf SW, the number of valid upper links) in step S22. Here, the function N=Min(x, y) comes to be N=y when x>y, N=x=y when x=y, and N=x when x<y.

Then, the job scheduler 10 (allocator 22) replaces the undermined node number Rest with Rest-N in step S23, and determines whether the undetermined node number Rest is zero or less in step S24.

If the undetermined node number Rest is zero or less (YES route in step S24), the job scheduler 10 (allocator 22) determines that a required number (i.e., the predetermined number) of nodes 100 have been successfully secured. In the ensuing step S25, the job scheduler 10 (allocator 22) allocates the job to be allocated to the nodes 100 subordinate to the leaf switches having been scanned, and terminates the job allocation process.

In contrast, if the undetermined node number Rest is larger than zero (NO route in step S24), the job scheduler 10 (allocator 22) determines that the required number of nodes have not been secured yet, and confirms, in step S26, whether all the leaf switches 200 have undergone the process of steps S22 to S24.

If at least one of all the leaf switches 200 has not undergone the process of steps S22 to S24 yet (NO route of step S26), the job scheduler 10 (allocator 22) selects the next leaf switch 200 as the target leaf switch 200 in step S27, and then returns to the process of step S22. Also in this case, the target leaf switch 200 may be selected from among the multiple leaf switches 200 in ascending or descending order of the switch number #i.

If all the leaf switches 200 have undergone the process of steps S22 to S24 (YES route of step S26), the job scheduler 10 determines that the parallel computer system 1 is in a state where the job to be allocated is not able to be extendedly allocated to nodes 100 subordinate to multiple leaf switches 200. Then the job scheduler moves to the process of step S3 of FIG. 9 to allocate the job to unoccupied nodes regardless of validity/invalidity of the upper links and then terminates the job allocation process.

Here, when the job allocation process is performed on the example of FIG. 4 along the flow diagrams illustrated in FIGS. 10 and 11, the job scheduler 10 specifically operates as follows. Here, description will now be made on the assumption that the job allocation like FIG. 2 is carried out in cases the nodes #1-#16 are all in an unoccupied state but the leaf #1 to leaf #4 have failure link numbers, which means the number of failure links among four links connected to each leaf switch, of 1, 2, 1, and 0, respectively. At that time, the leaf #1 to leaf #4 have valid link numbers of 3, 2, 3, and 4, respectively.

Figure 9:
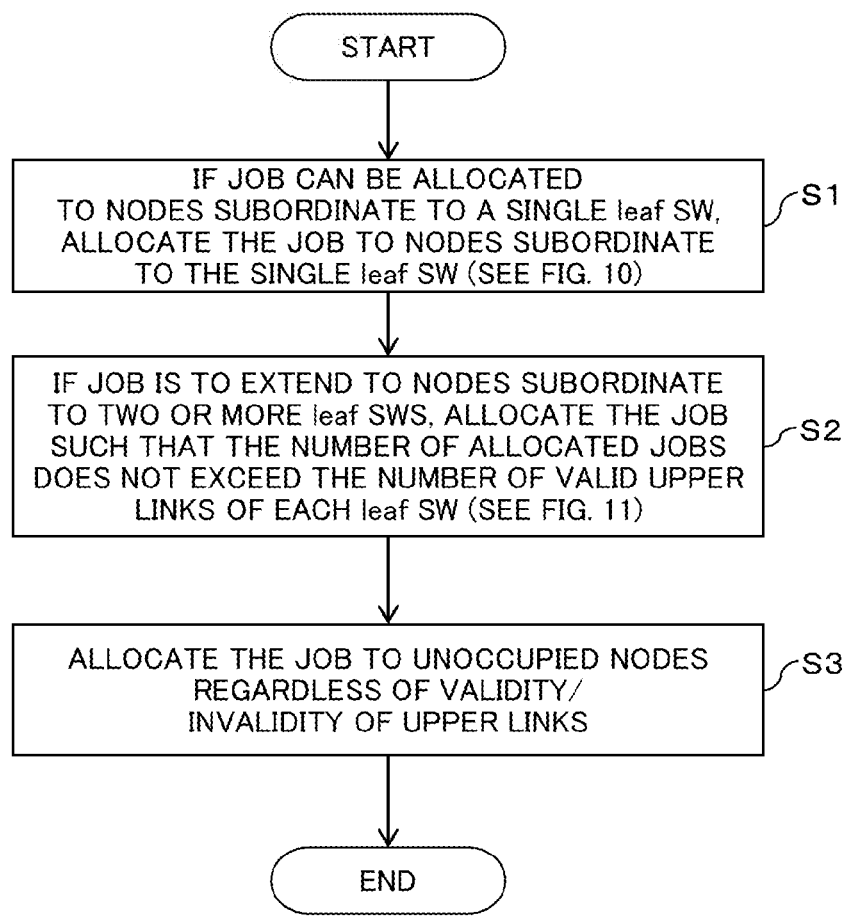
FIG. 9 is a flow diagram illustrating a succession of procedural steps of a job scheduling operation by an information processing apparatus of the present embodiment.
Figure 10:
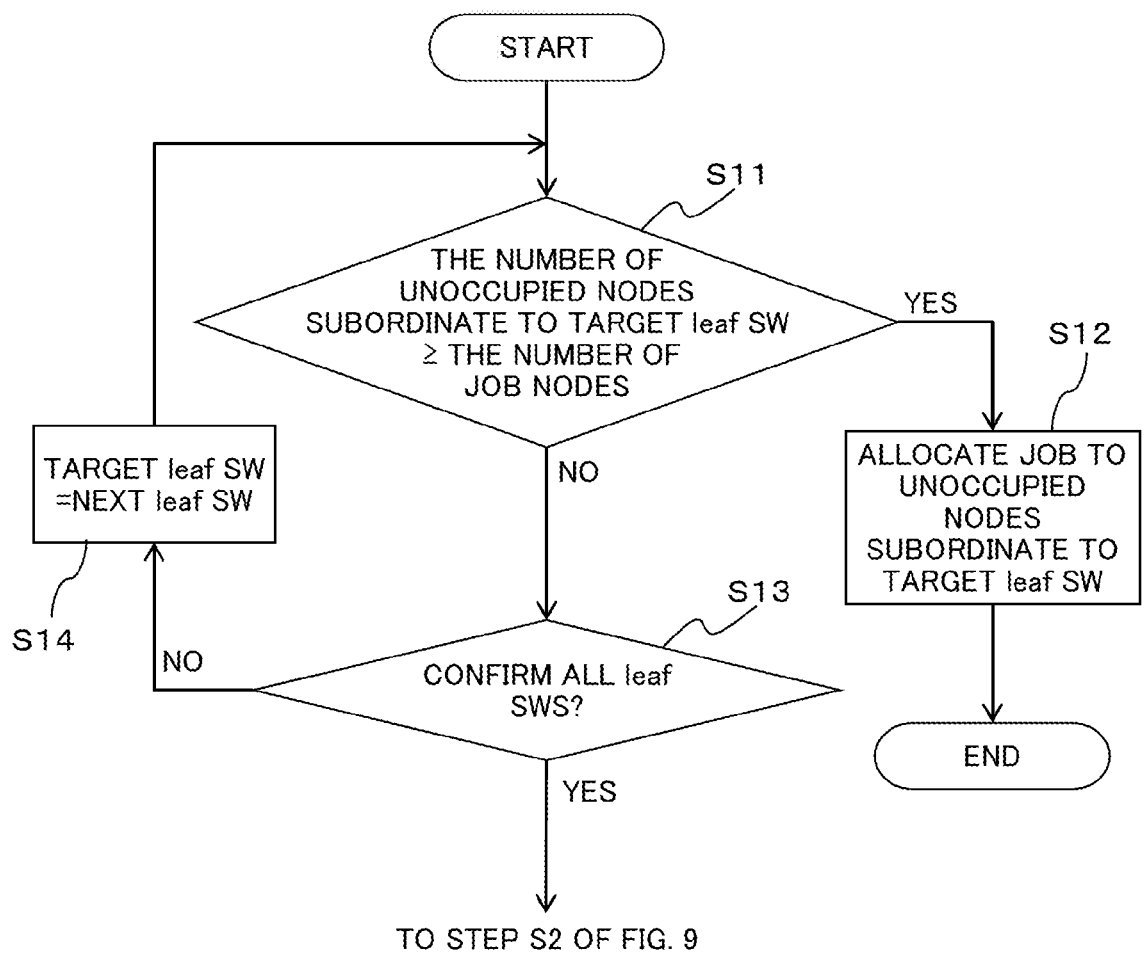
FIG. 10 is a flow diagram illustrating a succession of procedural steps of a job scheduling operation in allocating a job to nodes subordinate to a single leaf switch.
Figure 11:
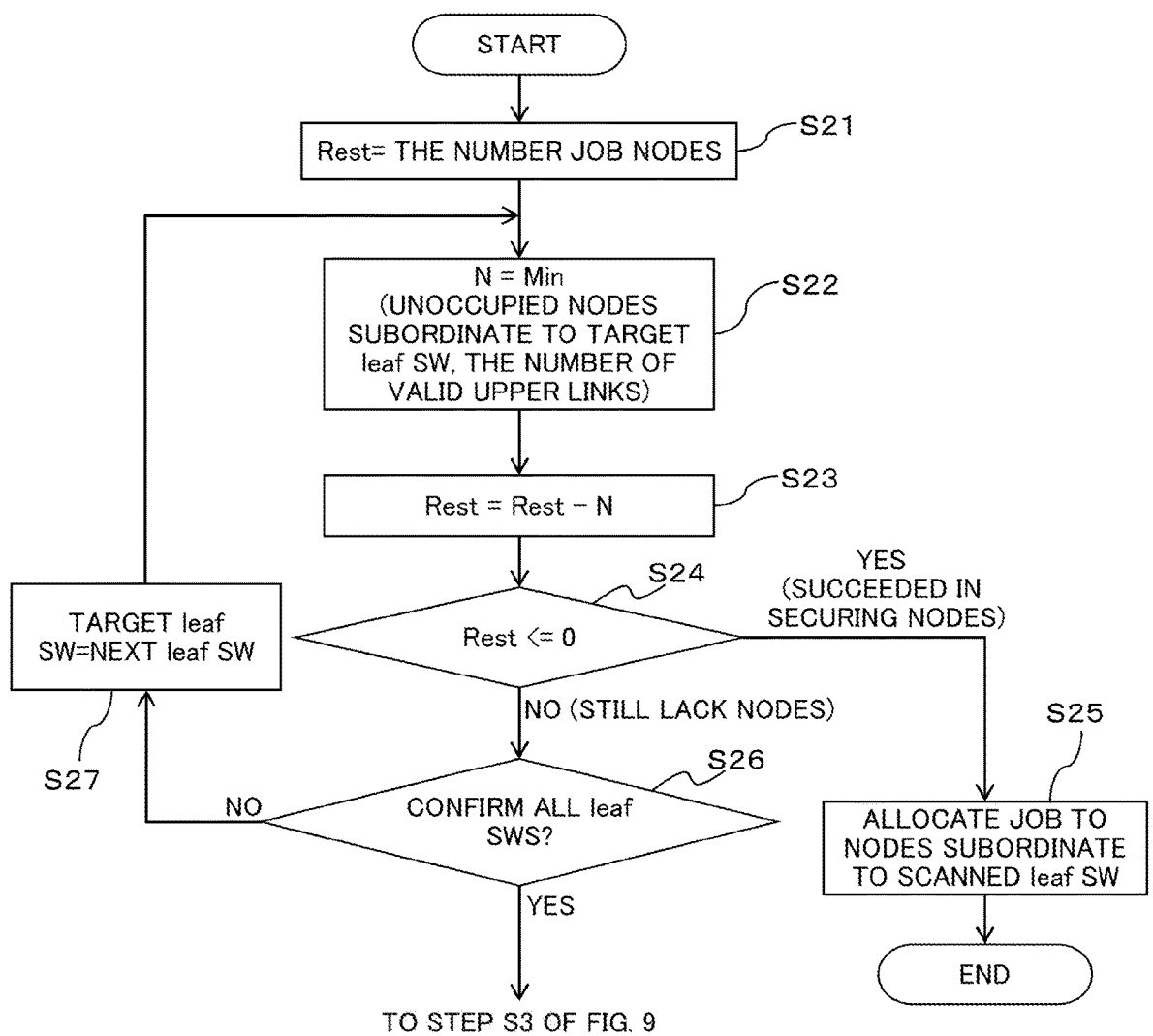
FIG. 11 is a flow diagram illustrating a succession of procedural steps of a job scheduling operation in allocating a job to nodes subordinate to multiple leaf switches.

The job scheduler 10 first allocates the job A, which uses eight nodes 100, and then moves to the process of FIG. 11 (i.e., the process of step S2 of FIG. 9) from the YES route of step S13 of FIG. 10. The undetermined node number Rest is set to the job node number=8 (step S21) and the function N=Min (unoccupied node number=4, the number of valid upper links=3)=3 is calculated for the target leaf #1 (step S22). Accordingly, the undetermined node number Rest=Rest−N=8−3=5 is calculated (step S23) to determine that the undetermined node number Rest=5>0 (NO route of step S24). In this case, the process of step S26 results in the NO determination and the next leaf #2 is selected as the target leaf switch 200 (step S27).

After that, the function N=Min (unoccupied node number=4, the number of valid upper links=2)=2 is calculated for the target leaf #2 (step S22). Accordingly, the undetermined node number Rest=Rest−N=5−2=3 is calculated (step S23) to determine that the undetermined node number Rest=3>0 (NO route in step S24). Also for the leaf #2, the process of step S26 results in the NO determination and the next leaf #3 is selected as the target leaf switch 200 (step S27).

After that, the function N=Min (unoccupied node number=4, the number of valid upper links=3)=3 is calculated for the target leaf #3 (step S22). Accordingly, the undetermined node number Rest=Rest−N=3−3=0 is calculated (step S23) to determine that the undetermined node number Rest=0 is zero or less (YES route in step S24). In this case, the job A is allocated to the unoccupied nodes #1-#3, #5, #6, #9-#11 subordinate to the scanned leaf #1 to the leaf #3 (step S25; see the top column of FIG. 4 and FIG. 12).

When the job scheduler 10 allocates the job B, which uses four nodes 100, after the allocation of the job A, the unoccupied node number being four comes to be equal to or more than the job node number being four when the target leaf switch 200 is the leaf #4 (YES route in step S11). At that time, the target leaf #4 is retrieved to be a single leaf switch 200 connected thereto the predetermined number four of unoccupied nodes 100. Consequently, the job B is allocated to the unoccupied nodes #13-#16 connected to the target leaf #4 (step S12, see the middle row of FIG. 4 and FIG. 12).

When the job scheduler 10 allocates the job C, which uses two nodes 100, after the allocation of the job B, the unoccupied node number being two comes to be equal to or more than the job node number being two when the target leaf switch 200 is the leaf #2 (YES route in step S11). At that time, the target leaf #2 is retrieved to be a single leaf switch 200 connected thereto the predetermined number two of unoccupied nodes 100. Consequently, the job C is allocated to the unoccupied nodes #7 and #8 connected to the target leaf #2 (step S12, see the bottom row of FIG. 4 and FIG. 12).

As described above with reference to FIGS. 4 and 12, in allocating a single job A extendedly to nodes of different leaf switches, the present embodiment allocates the job A to unoccupied nodes 100 in each of the different leaf switches not exceeding the number of valid upper links of the leaf switch 200. In cases where a job is to be allocated to nodes 100 belonging to different leaf switches 200, the job allocation is controlled such that the job A is allocated only to unoccupied nodes 100 in each of the different leaf switches not exceeding the number of upper effective links in the leaf switch 200. This can inhibit occurrence of a conflict caused from link failure in the communication after the job application, which consequently can avoid degrading of the system performance, such as lowering an amount of transferred data per unit time.

Figure 12:
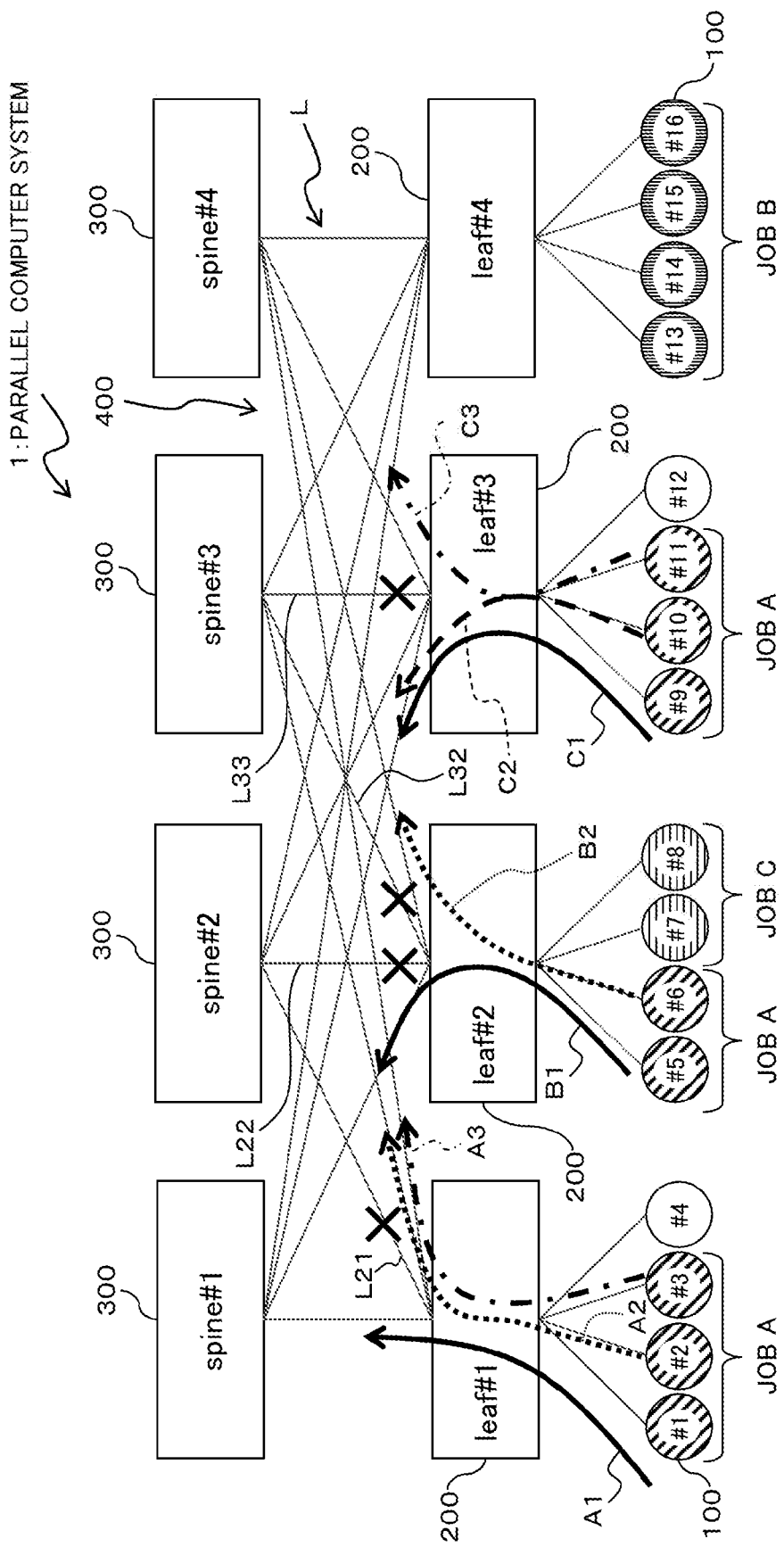
FIG. 12 is a diagram illustrating an example of enhancing the performance of the parallel computer system by the present embodiment.

Here, FIG. 12 is a diagram illustrating an example of exchanging the performance of the parallel computer system 1 according to the present embodiment. As illustrated in FIG. 12, even if failures (link down) occur on the links L21, L22, L32, and L33, occurrence of a conflict caused from link failure in the communication after the job allocation can be suppressed as indicated by the arrows A1-A3, B1, B2, and C1-C3.

Since the job C, which is allocated to the nodes #7 and #8 subordinate to the leaf #2, is a job that uses two nodes, the nodes #7 and #8 have a low possibility of communicating with nodes except for the nodes #7 and #8 after the job allocation and therefore have a low possibility of generating link conflicts. Likewise, since the job B, which is allocated to the nodes #13-#16 subordinate to the leaf #4, is a job that uses four nodes, the nodes #13-#16 have a low possibility of communicating with nodes except for the nodes #13-#16 after the job allocation and therefore also have a low possibility of generating link conflicts.

(6) Modifications

The present embodiment described above assumes that, in the retrieval by the retriever 21, the target leaf switch 200 is selected in ascending or descending order of the switch number #i.

(6-1) First Modification

In contrast to the above, the first modification uses an example of a sorter 23, which sorts the multiple leaf switches 200 in descending order of the number of failure links among the links L connected to each leaf switch 200 before the retrieval operation performed by the retriever 21. Then, the retriever 21 retrieves a leaf switch 200 which is connected thereto the predetermined number or more unoccupied nodes to by determining, in the order obtained through the sorting by the sorter 23, whether each leaf switch 200 is connected thereto the predetermined number or more unoccupied nodes.

Figure 13:
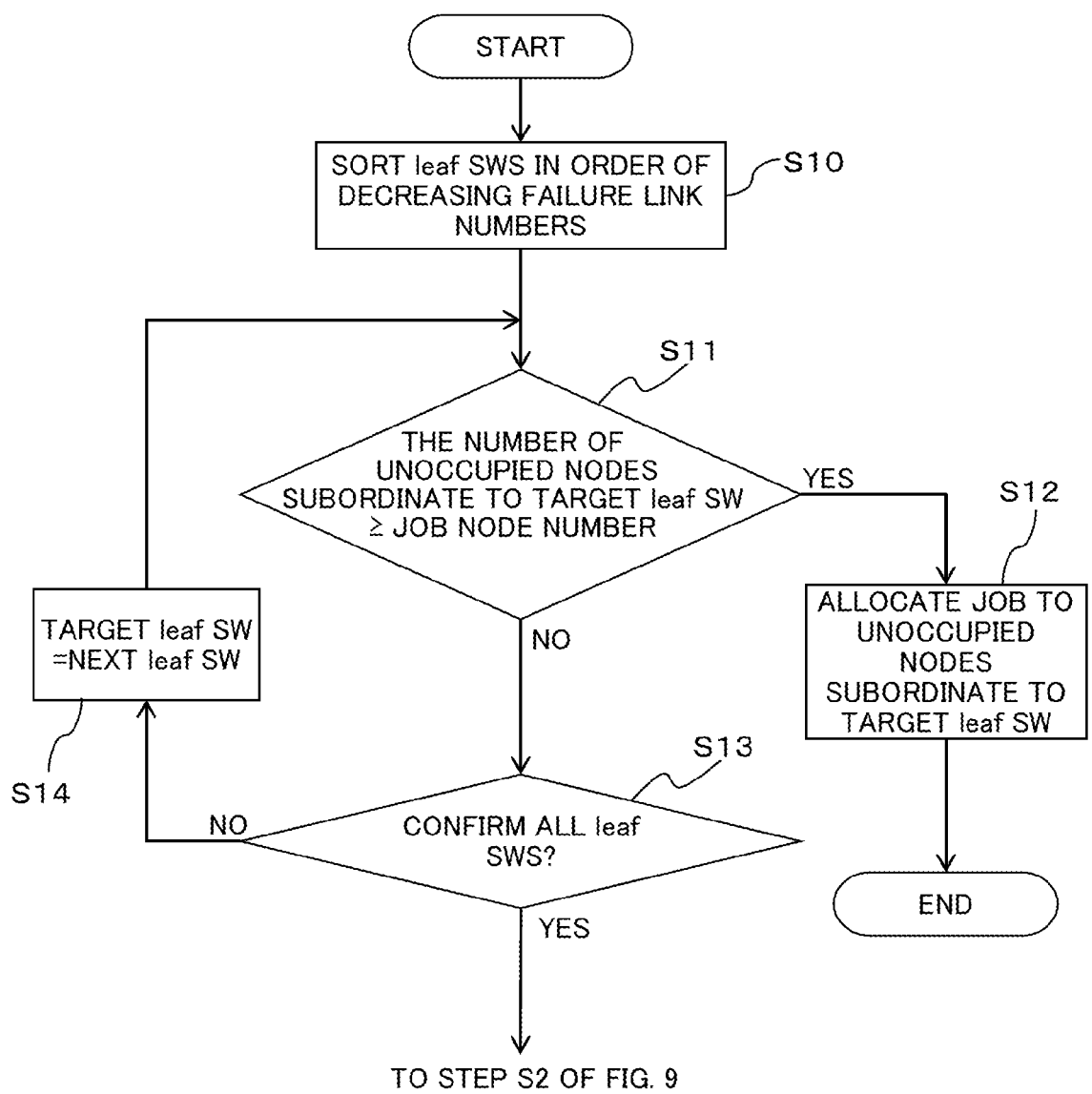
FIG. 13 is a flow diagram illustrating a modification to a succession of procedural steps of a job scheduling operation in allocating a job to nodes subordinate to a single leaf switch.

Here, FIG. 13 is a flow diagram illustrating a modification (first modification) to a job scheduling operation in allocating a job to nodes subordinate to a single leaf switch (step S1 of FIG. 9). As illustrated in FIG. 13, the flow diagram of the first modification is different from the flow diagram of FIG. 10 only in the point that the step S10 in which the leaf switches 200 are sorted in descending order of the number of failure links is performed before the step S11.

Accordingly, in allocation to a job to nodes 100 subordinate to a single leaf switch 200, each leaf switch 200 is selected as the target leaf switch 200 in descending order of the number of failure links (i.e., in order decreasing the number of failure links) in step S14. The process of steps S11-S14 of FIG. 14 correspond to the process of steps S11-S14 of FIG. 10, so repetitious description is omitted here.

Figure 14:
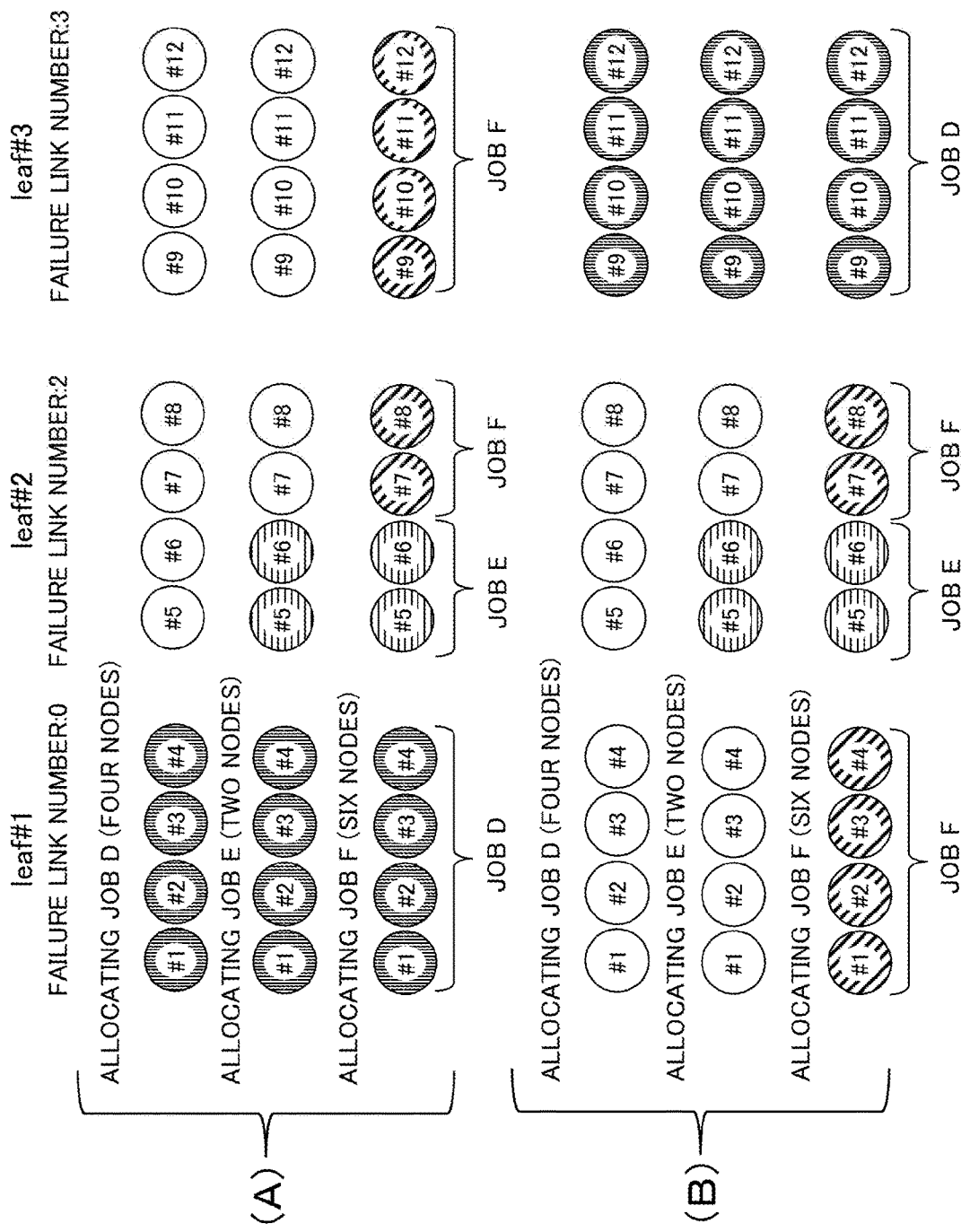
FIG. 14 is a diagram illustrating an example of enhancing the performance of the parallel computer system of by the job scheduling operation according to the modification of FIG. 13.

FIG. 14 illustrates an example of enhancing the performance of the parallel computer system 1 according to the modification (first modification) of FIG. 13 to the job scheduling operation. In FIG. 14, in cases where all the nodes #1-#12 are in an unoccupied state, but the leaves #1-#3 have failure link numbers of 0, 2, and 3, respectively, jobs are allocated in the following manner. Specifically, the job D that uses four nodes 100, the job E that uses two nodes 100, and the job F that uses six nodes 100 are allocated in this order. The valid link numbers of the leaves #1-#3 are 4, 2, and 1, respectively.

(A) of FIG. 14 illustrates a case where the retriever 21 selects the target leaf switch 200 in ascending order of the switch number #i in the retrieving operation performed by the retriever 21. Namely, in (A) of FIG. 14, the target leaf switch 200 is selected in the order of the leaf #1, the leaf #2, and the leaf #3.

In contrast, (B) of FIG. 14 illustrates a case where the target leaf switch 200 is selected in descending order of the number of failure links in the retrieval operation performed by the retriever 21. Namely, in (B) of FIG. 14, the target leaf switch 200 is selected in the order of the leaf #3, the leaf #2, and the leaf #1.

In the example of (A) of FIG. 14, the four unoccupied nodes #1-#4 subordinate to the leaf #1 are secured for the job D, and the job D is allocated to the secured nodes #1-#4 (see the top row of (A) of FIG. 14). Then, two unoccupied nodes #5 and #6 subordinate to the leaf #2 are secured for the job E, and the job E is allocated to the secured nodes #5 and #6 (see the middle row of (A) of FIG. 14). Finally, two unoccupied nodes #7 and #8 subordinate to the leaf #2 and four unoccupied nodes #9-#12 subordinate to the leaf #3 are secured for the job F, and the job F is allocated to the secured nodes #7-#12 (see the bottom row of (A) of FIG. 14).

In this event, since the six nodes #7-#12 used for the job F are extended to two leaves #2 and #3, there is a high possibility that the leaves #2 and #3 frequently communicate with each other. Moreover, the leaf #2 has a failure link number of two, i.e., the valid link number of two, and the leaf #3 has a failure link number of three, i.e., the valid line number of one, which means there is a high possibility of occurrence of a conflict on links between the leaf #2 and the leaf #3. Consequently, the system performance may be degraded.

In contrast, in the example of (B) of FIG. 14, the four unoccupied nodes #9-#12 subordinate to leaf #3 having the largest failure link number are secured for the job D, and the job D is allocated to the secured nodes #9-#12 (see the top row of (B) of FIG. 14). Then, two unoccupied nodes #5 and #6 subordinate to the leaf #2 having the second largest failure link number are secured for the job E, and the job E is allocated to the secured nodes #5 and #6 (see the middle row of (B) of FIG. 14). Finally, two unoccupied nodes #7 and #8 subordinate to the leaf #2 and four unoccupied nodes #1-#4 subordinate to the leaf #1 are secured for the job F, and the job F is allocated to the secured nodes #1-#4, #7, and #8 (see the bottom row of (B) of FIG. 14).

As described above, in allocation of a job to nodes subordinate to a single leaf switch in the first modification, the job is allocated preferentially from leaf switches 200 having larger failure link numbers. This allocation manner makes it possible to lower the possibility of using a failure link in cases where a job is allocated extendedly to two or more leaf switches 200 after a job has been allocated to nodes subordinate to a single leaf switch 200. Accordingly, occurrence of a conflict accompanied by a link failure can be suppressed, surely avoiding degrading of the system performance.

(6-2) Second Modification

The second modification uses another example of the sorter 23, which sorts the multiple leaf switches 200 in ascending order of the number of failure links connected to each leaf switch 200 before the allocation operation performed by the allocator 22. The allocator 22 allocates to job to unoccupied nodes not exceeding the number of valid links connected to each leaf switch 200 in the sorted order by the sorter 23.

Figure 15:
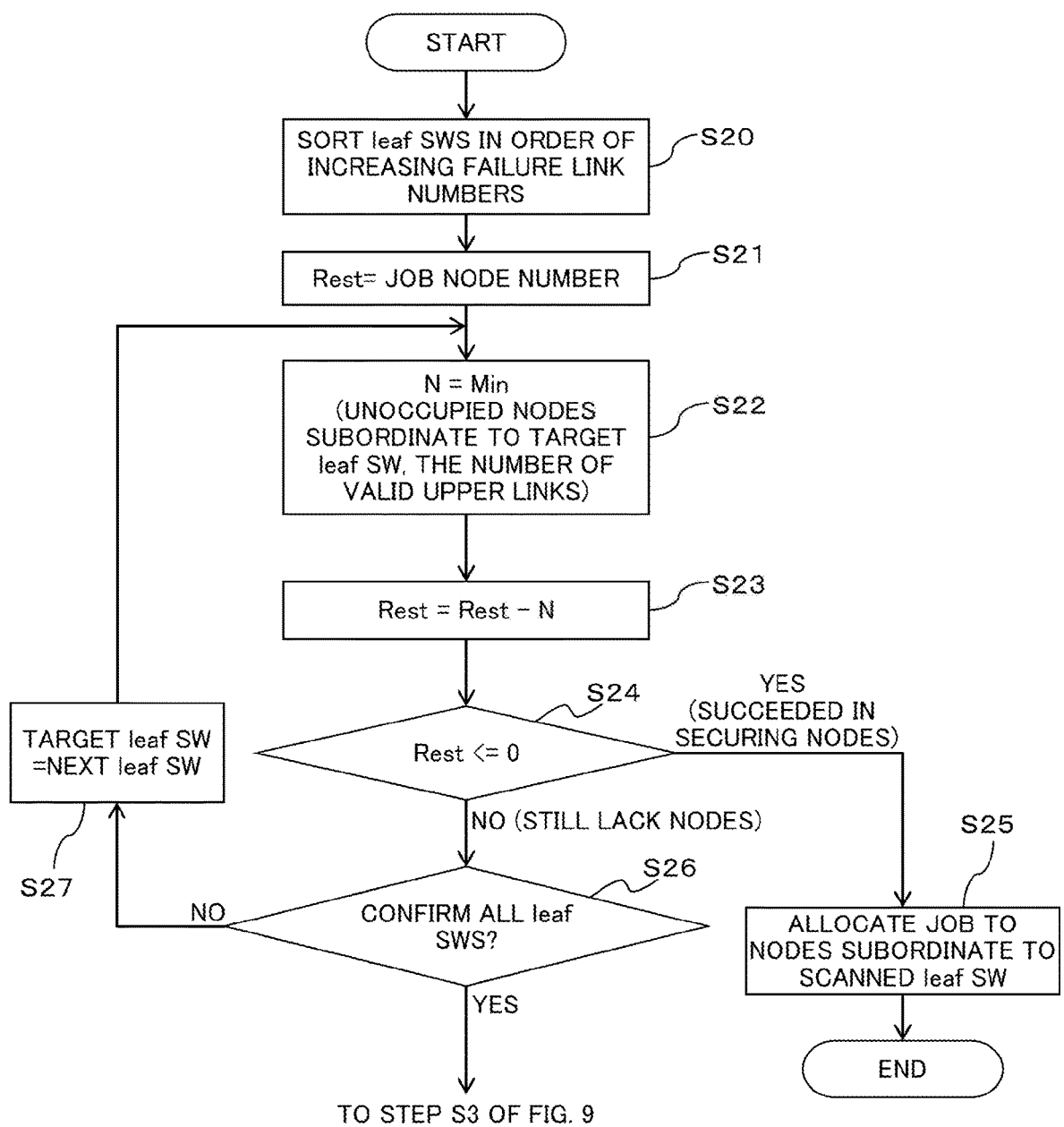
FIG. 15 is a flow diagram illustrating a modification to a succession of procedural steps of a job scheduling operation in allocating a job to nodes subordinate to multiple single leaf switches.

Here, FIG. 15 is a flow diagram illustrating a modification (second modification) to a job scheduling operation in allocating a job to nodes subordinate to multiple leaf switches (step S2 of FIG. 9). As illustrated in FIG. 15, the flow diagram of the second modification is different from the flow diagram of FIG. 11 only in the point that the step S20 in which the leaf switches 200 are sorted in ascending order of the number of failure links (i.e., in order of having smaller number of failure links) is performed before the step S21.

Accordingly, in allocation to a job extendedly to nodes subordinate to multiple leaf switches 200, each leaf switch 200 is selected as the target leaf switch 200 in ascending order of the number of failure links (i.e., order of having smaller number of failure links) in step S27. The process of steps S21-S27 of FIG. 15 correspond to the process of steps S21-S27 of FIG. 11, so repetitious description is omitted here.

Figure 16:
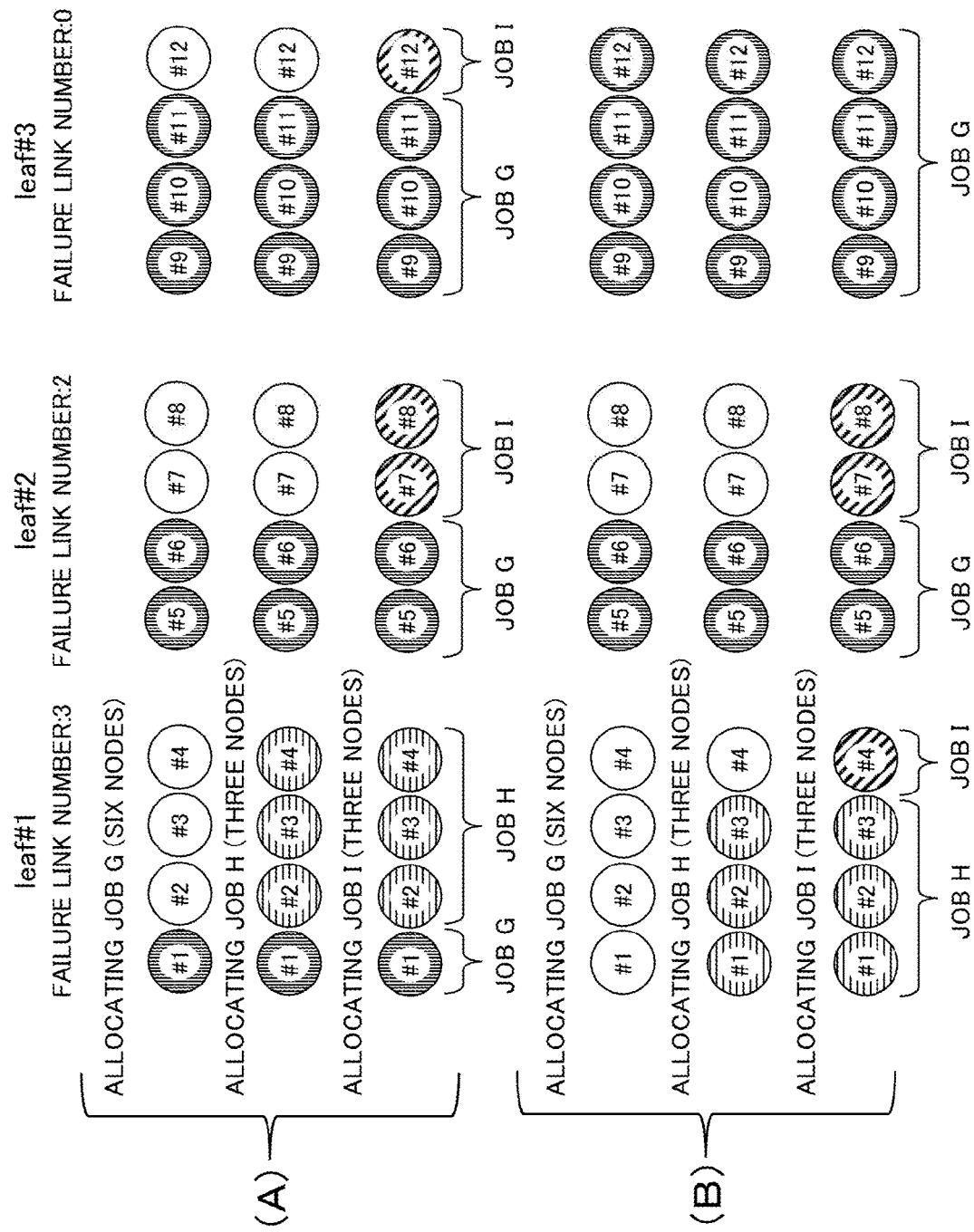
FIG. 16 is a diagram illustrating an example of enhancing the performance of the parallel computer system by the modification of FIG. 15.

FIG. 16 illustrates an example of enhancing the performance of the parallel computer system 1 according to the modification (second modification) of FIG. 15 to the job scheduling operation. In FIG. 16, in cases where all the nodes #1-#12 are in an unoccupied state but the leaves #1-#3 have failure link numbers of 3, 2, and 0, respectively, jobs are allocated in the following manner. Specifically, the job G that uses six nodes 100, the job H that uses three nodes 100, and the job I that uses three nodes 100 are allocated in this order. The valid link numbers of the leaves #1-#3 are 1, 2, and 4, respectively.

(A) of FIG. 16 illustrates a case where the target leaf switch 200 is selected in descending order of the switch number #i in allocating a job to nodes subordinate to multiple leaf switches 200. Namely, in (A) of FIG. 16, the target leaf switch is selected in the order of the leaf #1, the leaf #2, and the leaf #3.

In contrast, (B) of FIG. 16 illustrates a case where the target leaf switch 200 is selected in ascending order of the number of failure links in allocating a job to nodes subordinate to multiple leaf switches. Namely, in (B) of FIG. 16, the target leaf switch is selected in the order of the leaf #3, the leaf #2, and the leaf #1.

In the example of (A) of FIG. 16, the unoccupied nodes #1, #5, #6, and #9-#11 not exceeding the valid link number of the three leaves #1-#3 are secured for the job G, and the job G is allocated to the secured nodes #1, #5, #6, and #9-#11 (see the top row of (A) of FIG. 16). Then, three unoccupied nodes #2-#4 subordinate to the leaf #1 are secured for the job H, and the job H is allocated to the secured nodes #2-#4 (see the middle row of (A) of FIG. 16). Finally, two unoccupied nodes #7 and #8 subordinate to the leaf #2 and an unoccupied nodes #12 subordinate to the leaf #3 are secured for the job I, and the job I is allocated to the secured nodes #7, #8, and #12 (see the bottom row of (A) of FIG. 16).

In this event, since the six nodes #1, #5, #6, and #9-#11 used for the job G are extended to three leaves #1-#3, there is a high possibility that the leaves #1-#3 frequently communicate with one another. Moreover, the leaf #1 has a failure link number of three, i.e., the valid link number of one, and the leaf #2 has a failure link number of two, i.e., the valid line number of two, which means there is a high possibility of occurrence of a conflict on links between the leaves #1-#3. Consequently, the system performance may be degraded.

In contrast to the above, in the example of (B) of FIG. 16, the unoccupied nodes #9-#12, #5, and #6 not exceeding the respective valid link numbers of leaf #3 having the least failure link number and the leaf #2 having the second least failure link number are secured for the job G, and the job G is allocated to the secured nodes #9-#12, #5, and #6 (see the top row of (B) of FIG. 16). Then, three unoccupied nodes #1-#3 subordinate to the leaf #1 are secured for the job H, and the job H is allocated to the secured nodes #1-#3 (see the middle row of (B) of FIG. 16). Finally, a single unoccupied node #4 subordinate to the leaf #1 and two unoccupied nodes #7 and #8 subordinate to the leaf #2 are secured for the job I, and the job I is allocated to the secured nodes #4, #7, and #8 (see the bottom row of (B) of FIG. 16).

As described above, in allocation of a job to nodes subordinate to multiple leaf switches in the second modification, the job is allocated preferentially from leaf switches 200 having a smaller failure link numbers. This allocation manner makes it possible to reduce the number of leaf switches 200 extendedly allocated the same job and therefore to reduce the possibility of using a failure link. Accordingly, occurrence of a conflict accompanied by a link failure can be suppressed, surely avoiding degrading of the system performance.

Alternatively, both the first and second modifications may be applied to the job scheduling of the present embodiment described above by referring to FIGS. 9-11, and either one of the first and second modifications may be applied to the job scheduling of the present embodiment described above by referring to FIGS. 9-11.

(7) Miscellaneous

A preferable embodiment of the present invention is described as the above. However, the present invention should by no means be limited to a particular embodiment, and various changes and modifications can be suggested without departing from the scope of the present invention.

According to the present embodiment, it is possible to suppress occurrence of a conflict accompanied by a link failure and consequently to avoid degrading of the performance.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An information processing apparatus included in an information processing system comprising:
    a plurality of nodes,
    a plurality of first switches each of which is connected to a set of respectively unique nodes among the plurality of nodes, and
    a plurality of second switches each of which is connected thereto the plurality of first switches via a plurality of links including valid links and failure links,
    the information processing apparatus comprising a processor that allocates a job executed in a predetermined number of nodes to one or more nodes among the plurality of nodes, the processor is configured to execute a process comprising:
    determining whether a single target switch of the plurality of first switches is connected to a plurality of unoccupied nodes equal to or more than the predetermined number of nodes, the plurality of unoccupied nodes are among the plurality of nodes;
    upon determining that the single target switch is connected to the plurality of unoccupied nodes equal to or more than the predetermined number of nodes, allocating the job to the plurality of unoccupied nodes connected to the single target first switch; and
    upon determining that the single target switch is not connected to the plurality of unoccupied nodes equal to or more than the predetermined number of nodes, allocating the job to unoccupied nodes connected to each of two or more target first switches among the plurality of the first switches,
    a number of the unoccupied nodes connected to each of the two or more target first switches does not exceed a number of the valid links among the plurality of links connected to each of the two or more target first switches.

2. The information processing apparatus according to claim 1, wherein the processor is further configured to:
    sort the plurality of first switches in order of decreasing number of the failure links among the plurality of links connected to each of the plurality of first switches; and
    wherein the determining comprises determining whether the plurality of unoccupied nodes are connected to each of the plurality of the first switches in order obtained by the sorting.

3. The information processing apparatus according to claim 2, wherein the processor is further configured to:
    sort the plurality of first switches in order of increasing number of the failure links among the plurality of links connected to each of the plurality of first switches; and
    wherein the allocating the job to the unoccupied nodes connected to each of the two or more target first switches comprises allocating the job to the number of the unoccupied nodes connected to each of the two or more target first switches sequentially in order obtained through the sorting.

4. The information processing apparatus according to claim 1, wherein the processor is further configured to:
    sort the plurality of first switches in order of increasing number of the failure links among the plurality of links connected to each of the plurality of first switches; and
    wherein the allocating the job to the unoccupied nodes connected to each of the two or more target first switches comprises allocating the job to the number of the unoccupied nodes connected to each of the two or more target first switches sequentially in order obtained through the sorting.

5. A non-transitory computer-readable recording medium having stored therein a program that causes a computer to execute a process comprising:
    in an information processing system comprising a plurality of nodes, a plurality of first switches each of which is connected to a set of respectively unique nodes among the plurality of nodes, and a plurality of second switches each of which is connected thereto the plurality of first switches via a plurality of links, in allocating a job executed in a predetermined number of nodes to one or more nodes among the plurality of nodes,
    determining whether a single target switch of the plurality of first switches is connected to a plurality of unoccupied nodes equal to or more than the predetermined number of nodes, wherein the plurality of unoccupied nodes are among the plurality of nodes;
    upon determining that the single target switch is connected to the plurality of unoccupied nodes equal to or more than the predetermined number of nodes, allocating the job to the plurality of unoccupied nodes connected to the single target first switch; and
    upon determining that the single target switch is not connected to the plurality of unoccupied nodes equal to or more than the predetermined number of nodes, allocating the job to unoccupied nodes connected to each of two or more target first switches among the plurality of the first switches,
    wherein a number of the unoccupied nodes connected to each of the two or more target first switches does not exceed a number of the valid links among the plurality of links connected to each of the two or more target first switches.

6. The non-transitory computer-readable recording according to claim 5, the process further comprising:
    sorting the plurality of first switches in order of decreasing number of the failure links among the plurality of links connected to each of the plurality of first switches, wherein wherein the determining comprises determining whether the plurality of unoccupied nodes are connected to each of the plurality of the first switches in order obtained by the sorting.

7. The non-transitory computer-readable recording according to claim 6, the process further comprising:
sorting the plurality of first switches in order of increasing number of the failure links among the plurality of links connected to each of the plurality of first switches; and
wherein the allocating the job to the unoccupied nodes connected to each of the two or more target first switches comprises allocating the job to the number of the unoccupied nodes connected to each of the two or more target first switches sequentially in order obtained through the sorting.

8. The non-transitory computer-readable recording according to claim 5, the process further comprising:
sorting the plurality of first switches in order of increasing number of the failure links among the plurality of links connected to each of the plurality of first switches; and
wherein allocating the job to the unoccupied nodes connected to each of the two or more target first switches comprises allocating the job to the number of the unoccupied nodes connected to each of the two or more target first switches sequentially in order obtained through the sorting.

9. A method of processing information, in an information processing system comprising a plurality of nodes, a plurality of first switches each of which is connected to a set of respectively unique nodes among the plurality of nodes, and a plurality of second switches each of which is connected thereto the plurality of first switches via a plurality of links, in allocating a job executed in a predetermined number of nodes to one or more nodes among the plurality of nodes, the method comprising:
determining whether a single target switch of the plurality of first switches is connected to a plurality of unoccupied nodes equal to or more than the predetermined number of nodes, wherein the plurality of unoccupied nodes are among the plurality of nodes;
upon determining that the single target switch is connected to the plurality of unoccupied nodes equal to or more than the predetermined number of nodes, allocating the job to the plurality of unoccupied nodes connected to the single target first switch; and
upon determining that the single target switch is not connected to the plurality of unoccupied nodes equal to or more than the predetermined number of nodes, allocating the job to unoccupied nodes connected to each of two or more target first switches among the plurality of the first switches,
wherein a number of the unoccupied nodes connected to each of the two or more target first switches does not exceed a number of the valid links among the plurality of links connected to each of the two or more target first switches.

10. The method according to claim 9, further comprising:
sorting the plurality of first switches in order of decreasing number of the failure links among the plurality of links connected to each of the plurality of first switches, wherein
the determining comprises determining whether the plurality of unoccupied nodes are connected to each of the plurality of the first switches in order obtained by the sorting.

11. The method according to claim 10, further comprising:
sorting the plurality of first switches in order of increasing number of the failure links among the plurality of links connected to each of the plurality of first switches; and
wherein the allocating the job to the unoccupied nodes connected to each of the two or more target first switches comprises allocating the job to the number of the unoccupied nodes connected to each of the two or more target first switches sequentially in order obtained through the sorting.

12. The method according to claim 9, further comprising:
sorting the plurality of first switches in order of increasing number of the failure links among the plurality of links connected to each of the plurality of first switches; and
wherein allocating the job to the unoccupied nodes connected to each of the two or more target first switches comprises allocating the job to
the number of the unoccupied nodes connected to each of the two or more target first switches sequentially in order obtained through the sorting.

* * * * *